United States Patent
Yoshida

(10) Patent No.: US 10,933,440 B2
(45) Date of Patent: Mar. 2, 2021

(54) CARBON FILM COATING STRUCTURE FOR WORK AND CARBON FILM COATING METHOD FOR WORK

(71) Applicant: Hideo Yoshida, Tokorozawa (JP)

(72) Inventor: Hideo Yoshida, Tokorozawa (JP)

( * ) Notice: Subject to any disclaimer, the term of this patent is extended or adjusted under 35 U.S.C. 154(b) by 84 days.

(21) Appl. No.: 16/103,515

(22) Filed: Aug. 14, 2018

(65) Prior Publication Data

US 2019/0374974 A1 Dec. 12, 2019

(30) Foreign Application Priority Data

Jun. 12, 2018 (JP) .............................. JP2018-111889

(51) Int. Cl.
*B05D 1/02* (2006.01)
*C23C 18/16* (2006.01)
*C25D 5/34* (2006.01)

(52) U.S. Cl.
CPC .............. *B05D 1/02* (2013.01); *C23C 18/165* (2013.01); *C25D 5/34* (2013.01); *Y10T 428/249955* (2015.04); *Y10T 428/249956* (2015.04); *Y10T 428/249991* (2015.04)

(58) Field of Classification Search
CPC ....... B05D 1/02; C01B 2202/02; B01J 20/205
See application file for complete search history.

(56) References Cited

U.S. PATENT DOCUMENTS

| 2006/0046602 | A1* | 3/2006 | Kang | ..................... B82Y 10/00 445/50 |
| 2014/0083752 | A1* | 3/2014 | Walczak | ..................... C08J 3/02 174/257 |
| 2014/0087164 | A1* | 3/2014 | LeMieux | ............. H01L 31/1884 428/220 |
| 2016/0362792 | A1* | 12/2016 | Yoshida | .................. B32B 9/005 |

FOREIGN PATENT DOCUMENTS

| JP | 2005-213056 A | 8/2005 |
| JP | 2007-019453 A | 1/2007 |
| JP | 2014-111231 A | 6/2014 |
| JP | 2017-001312 A | 5/2017 |

* cited by examiner

*Primary Examiner* — Hai Vo
(74) *Attorney, Agent, or Firm* — Norris McLaughlin, P.A.

(57) ABSTRACT

A carbon film coating structure and a method for coating that structure onto a work are provided, in which a carbon material such as a carbon nanotube is applied to a work for coating thereof with high density and high integration so that the coating has an outstanding electrical conductivity and thermal conductivity, heat resistance, high strength and flexibility owing to the characteristics of carbon, and in which a carbon such as CNT is applied to the work for coating thereof easily and inexpensively, and with high density and high integration. A carbon material is coated or impregnated on a surface layer of a work. The work can deposit a suboxide or oxide containing metal ions. A porous primary film is formed on the surface layer of the work. The carbon film is coated or impregnated on an irregular part of the surface layer of the primary film.

11 Claims, 19 Drawing Sheets

WORK IS BENT AFTER CARBON FILM IS FORMED

PRIMARY FILM IS DEPOSITED ON WORK

PRIMARY FILM IS FORMED ON WORK

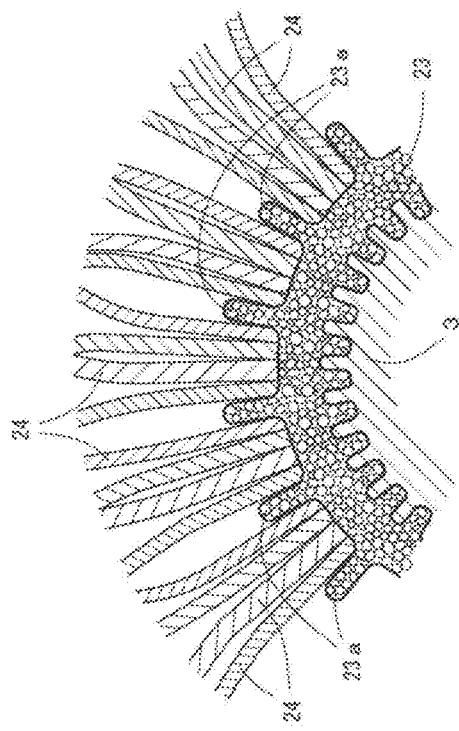
Fig. 8 BENDING STATE OF SECONDARY FILM (COATING)
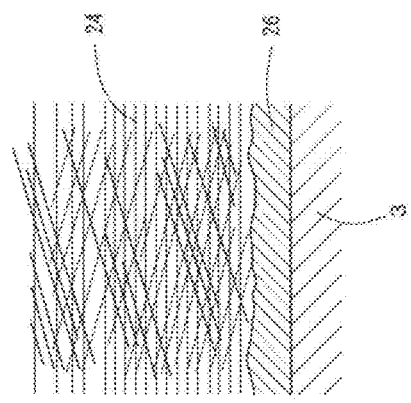
Fig. 9 CONVENTIONAL SECONDARY FILM (COATING)

CONCEPT OF NEW SURFACE TREATING PROCESS

CRYSTAL STRUCTURE OF SURFACE OF PRIMARY FILM

Fig. 13 SECTIONAL VIEW OF COMPOSITE FILM OF PRIMARY FILM AND CNT

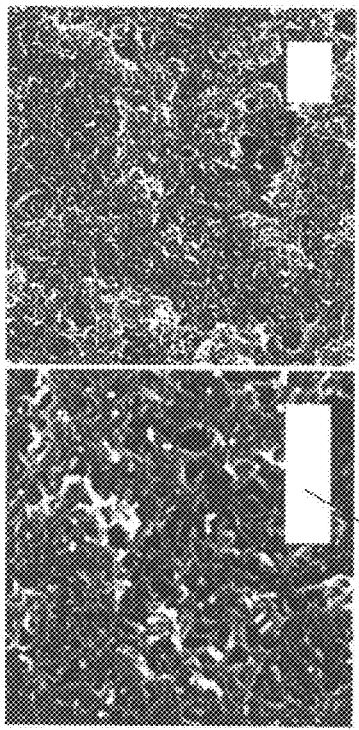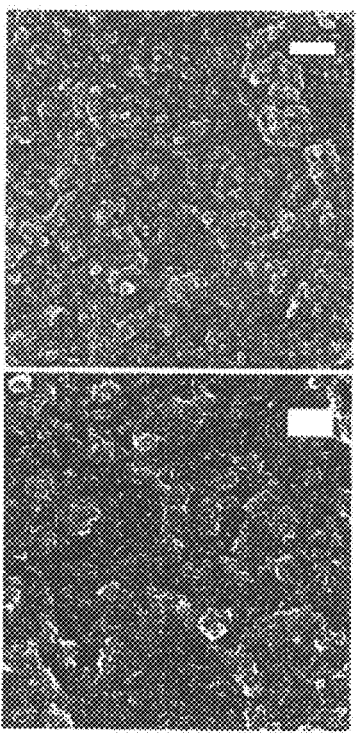

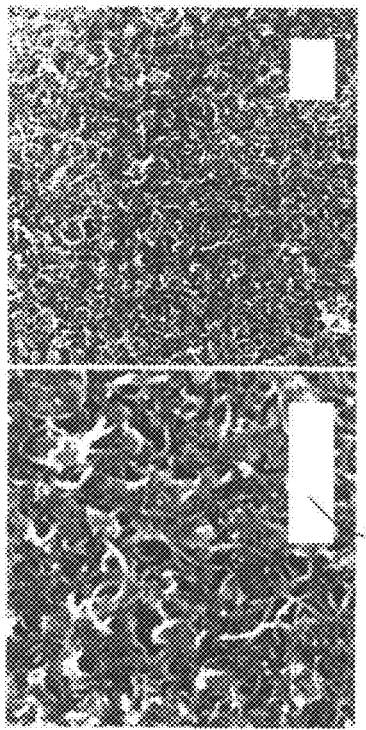
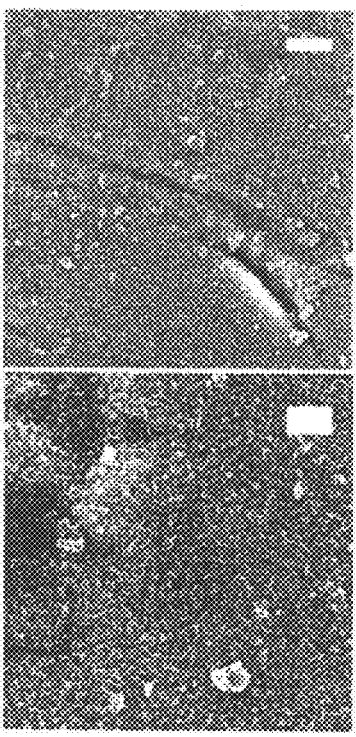

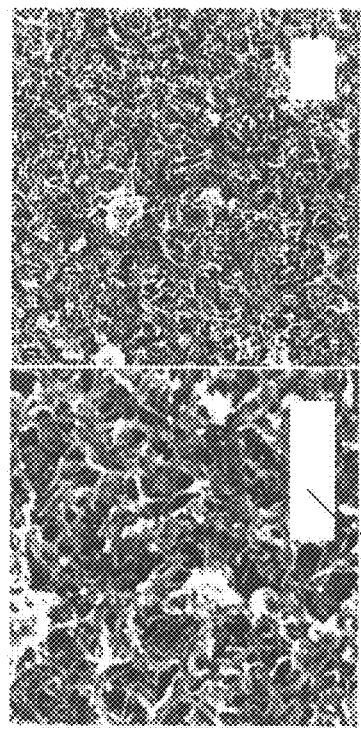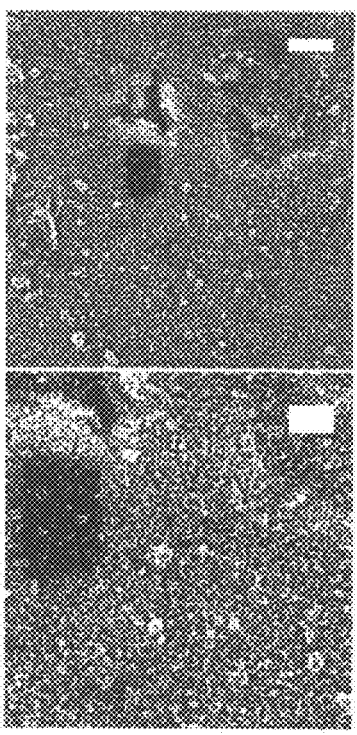
Fig. 18(a) Fig. 18(b) Fig. 18(c) Fig. 18(d)

SAMPLE A CENTRAL PART
Fig. 19 (a)  Fig. 19 (b)
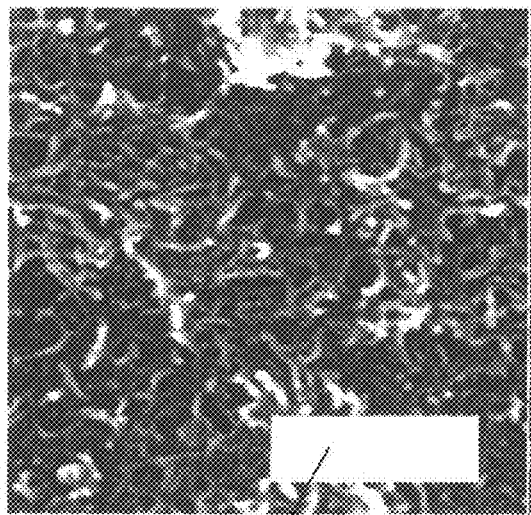 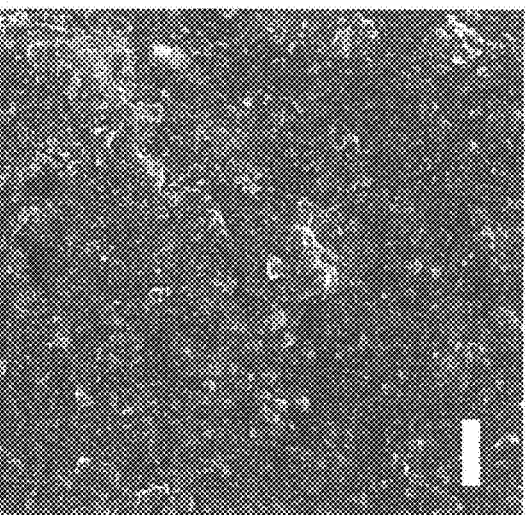
×35,000  ×3,000
SCALE BAR
SAMPLE D DISTAL END PART
Fig. 19 (c)  Fig. 19 (d)
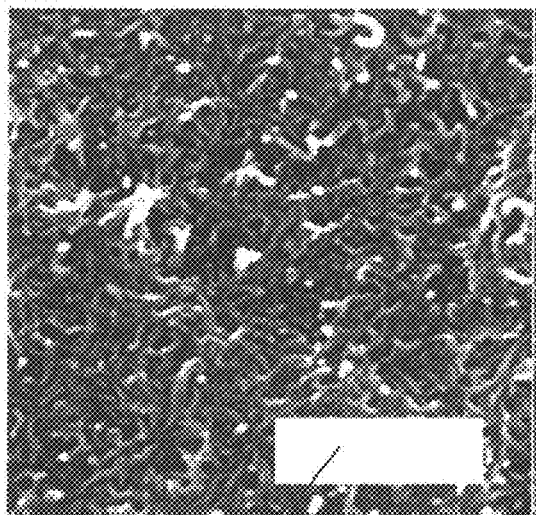 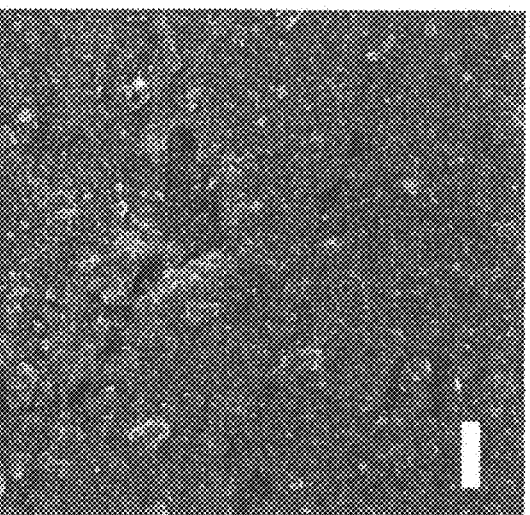
×35,000  ×3,000
SCALE BAR

CARBON FILM IS FORMED ON PRIMARY FILM

WORK IS BENT AFTER CARBON FILM IS FORMED

Fig. 23 (a) DIP
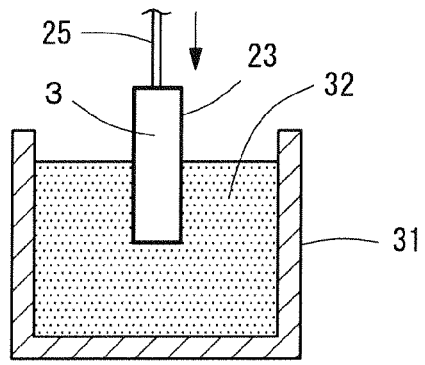
Fig. 23 (b) PULL UP
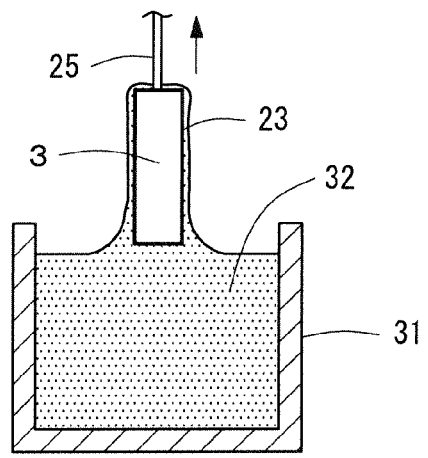
Fig. 23 (C) DRY
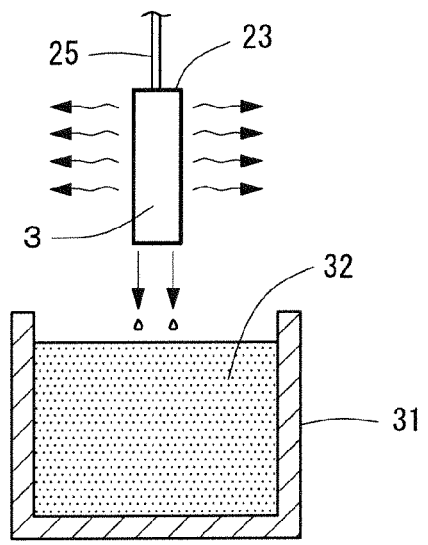

CARBON FILM IS FORMED ON PORES AND SURFACE OF ANODIZED FILM
Fig. 24 (a) DIP
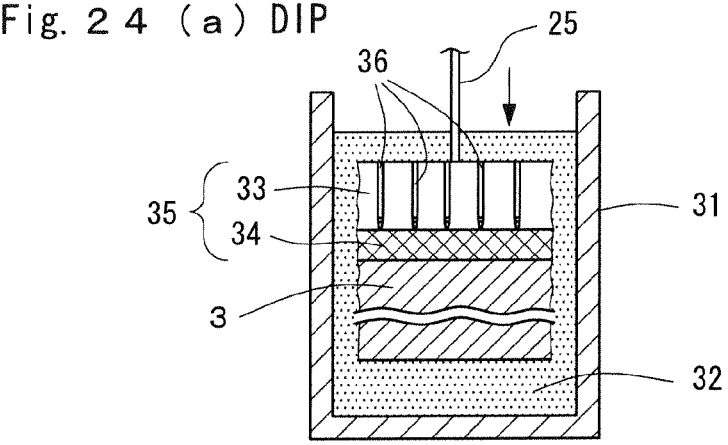
Fig. 24 (b) PULL UP
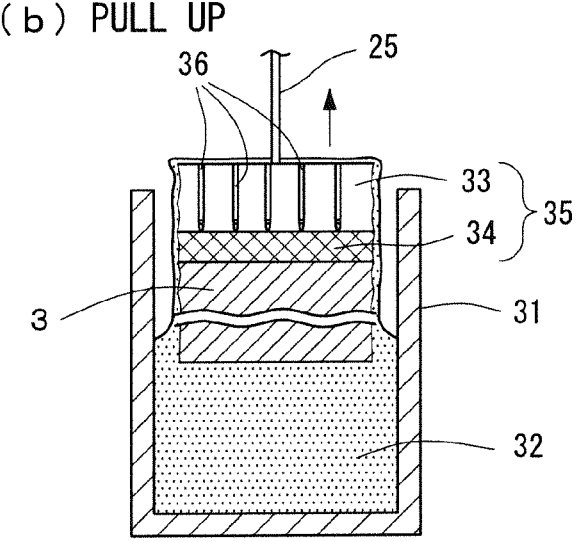
Fig. 24 (c) DRY
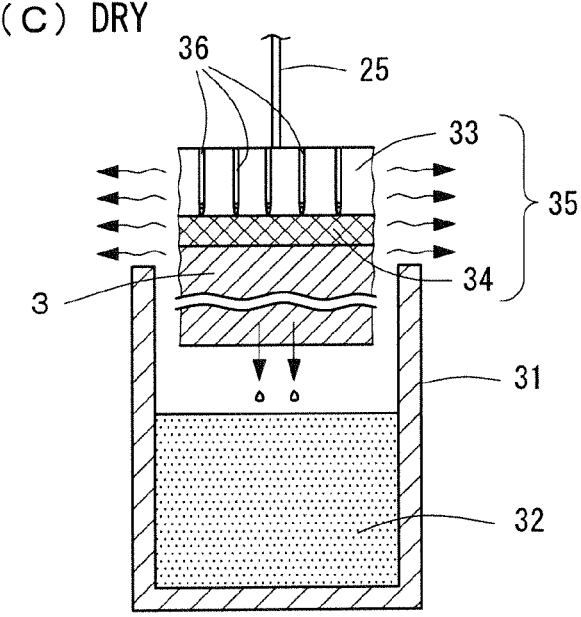

CARBON FILM COATING STRUCTURE FOR WORK AND CARBON FILM COATING METHOD FOR WORK

BACKGROUND OF THE INVENTION

The present invention relates to a carbon film coating structure for a work and a carbon film coating method for a work, in which a carbon material such as a carbon nanotube (hereinafter simply referred to as "CNT") is applied to the work for coating thereof with high density and high integration so that it has an outstanding electrical conductivity and thermal conductivity, heat resistance, high strength and flexibility owing to the characteristics of the carbon, and in which a carbon such as CNT is applied to the work for coating thereof easily and inexpensively, and with high density and high integration.

Carbon nanotube has been drawing attention as a compound having not only a high electrical conductivity and thermal conductivity, but also outstanding physical properties.

Since the development, however, CNT has hardly been used as a concrete product or a part until today, and development as a practical technology, that can be utilized in various industrial fields, has been desired.

Under the above-mentioned circumstance, the present inventor tackled with various technical developments that make good use of the characteristics of CNT.

One example is a mixing method in which CNT is mixed to a painting material and ink. However, this method for mixing CNT to a painting material and ink had such a disadvantage that viscosity is increased, thereby decreasing the painting performance. Therefore, the limit of practical use was 5% for CNT to be mixed and thus, its use was limited.

In general, it has been considered that as long as the painting material is dispersible, it would probably be industrialized and would also be spread easily. However, the dispersing technique of CNT was difficult to achieve. Particularly, there was a limit in uniformity and density of CNT. Moreover, difficulty of optimization with polymer paint depending on the type of carbon existed. Furthermore, difficulty in production and maintenance of the paint was also very high. Those disadvantages made it difficult for CNT to spread widely into the market.

Next example is the "co-precipitation method" using a plating technique. If CNT can be successfully dispersed in a plating solution and precipitated therein, it should spread as industrial use.

However, the CNT co-precipitation method has such a low CNT precipitation ratio as less than 1% and is far from the practical-use technology. Moreover, it had such additional inconveniences that the dispersing state of CNT in the plating solution is difficult to maintain, the limit of the impregnating ratio of CNT in the depositing film is so low as approximately 15/1000, distribution on the depositing film is uneven, and management and maintenance of the composition of the plating solution are difficult, thereby preventing the spread of this co-precipitation method as industrial use.

Another example is a "kneading method", in which the CTN is mixed with a rubber and the like. It was expected that CNT is added to rubber about 10%, so that they are kneaded to a stable dispersing structure. However, it gave rise to such problems that reliability in quality of the product was difficult to obtain due to difficulty in maintenance of the characteristics of the rubber, and it is difficult to optimize the conditions for characterization due to correlation between the CNT dispersing technique and impurities contained in the materials. Therefore, its spreading as industrial use was hindered.

Moreover, despite various efforts taken in a manner as mentioned above, CNT did not spread because various problems could not be solved such as: adhesion to the work (raw material) is poor and the dispersing state of CNT is reduced in quality in a short time, thus making it unable to solve the above-mentioned problems.

Furthermore, each of the above-mentioned techniques was a usage limited to very narrow applications. In this usage, CNT was used for the purpose of improving the poor characteristics of the raw material. It was not a usage for effectively using the valuable characteristics inherent to CNT, such as high electrical conductivity, thermal conductivity and heat resistance as they are.

Thus, the present inventor thought up a novel method, which is entirely different from any of the above-mentioned methods, by means of effectively combining his own techniques with CNT.

Specifically, the present inventor developed a film forming structure on a work, in which an impregnation layer formed by a thin primary film, which consists of a suboxide or oxide including a metal, is formed on a surface of the work, the primary film is formed to have a porous film, and the primary film is impregnated with a secondary film consisting of any one of a polymeric material, an inorganic or organic paint, a functional material or ceramics, and already proposed it in the form of P2015-118459 (see, for example, JP-A-2017-1312).

Then, the present inventor worked out, based on the above-mentioned (or proposed) technique, a novel film formation, which is obtained by laminating a CNT dispersing solution in multi-layers on the porous primary layer in accordance with the dipping method or coating method, and when it is required to add more functions, a functional film is laminated to form a novel film.

At that time, it was presumed that fine grains or crystals of the secondary film are disposed independently and with high density at an irregular part of the primary film, and a metal material and carbon material are used as the functional material.

Therefore, when CNT is used as the carbon material, it becomes important how CNT is disposed with high density and high integration in order to form a dense carbon layer, and how to select CNT which is compatible with the primary film. Moreover, it also becomes important how to select the dispersing agent which is compatible with the selected CNT and how to select the content ratio, and how to design and manufacture the apparatus in an optimal state.

Conventionally, there is a known method for manufacturing a heat radiating plate as a method for forming a carbon material with high density and high integration, in which, for example, CNT is coated by dipping a heat radiating fin of the heat radiating plate in a bath containing a solvent with the CNT dispersed therein so as to adhere the CNT to the surface of the heat radiating fin, the resultant is heated to approximately 80 to 95° C. and dried, and then, repeating the dipping and drying process (see, for example, JP-A-2007-19453).

However, the above-mentioned CNT coating method had such problems that since the surface of the heat radiating fin is smooth, the solvent with the CNT dispersed is difficult to adhere to the surface of the heat radiating fin, its attachment is not uniformly made, thereby making it difficult to obtain density, and CNT is difficult to be coated uniformly.

Also, there is another known method for manufacturing a hard active carbon adhesive agent, in which, porous particles such as alumina are used as a basic body, and this basic body, as a flowing medium, is put into various incinerators, and unburnt tar or unburnt hydrocarbon components generated during combustion of raw materials are captured in pores of the basic body due to capacity effect of the porous holes, and then, the basic body is heated at a temperature of 500 to 1200° C. under no oxide atmosphere, so that the carbon is coated to the inner surface of each hole and the outer surface of the basic body (see, for example, JP-A-2005-213056).

However, the above-mentioned manufacturing method had such problems that an expensive large equipment of the incinerator and no oxide atmosphere is required, and during the manufacturing process, the unburned tar and unburned hydrocarbon components are difficult to be captured in the pores and various cumbersome steps are required, thereby requiring much time and labor.

As means for solving the above-mentioned problems, there is a carbon coating porous body having a porous substrate which contains silicon and oxygen, or aluminum, silicone and oxygen, and a carbon film coating at least a part of the inner surface of each pore of the porous substrate, the carbon film having nitrogen or boron as atoms constituting the skeleton of the hexagonal network structure and an amino group, a sulfone group, or a carboxyl group as a functional group (see, for example, JP-A-2014-111231).

However, the carbon coating porous member gives rise to such a problem that since a part of the inner surface of the pore of the porous substrate is coated with the carbon film and the outer surface thereof is not covered therewith, sufficient characteristics owing to the carbon film cannot be obtained.

SUMMARY OF THE INVENTION

The present invention addresses such problems and aims to provide a carbon film coating structure for a work and a carbon film coating method for a work, in which a carbon material such as a carbon nanotube is applied to the work for coating thereof with high density and high integration so that it has an outstanding electrical conductivity and thermal conductivity, heat resistance, high strength and flexibility owing to the characteristics of the carbon, and in which a carbon such as CNT is applied to the work for coating thereof easily and inexpensively, and with high density and high integration.

According to the first aspect of the invention, a carbon film coating structure for a work comprises a work having a surface layer on which a carbon film is formed or impregnated, wherein the work can deposit a suboxide or oxide containing metal ions, a porous primary film is formed on the surface layer of the work, and a carbon film is coated or impregnated on an irregular part of the surface layer of the primary film. Accordingly, by virtue of the porous part or irregular part of the primary film, the carbon film is rigidly and densely coated or impregnated. Moreover, owing to the characteristics of the carbon, an outstanding electrical conductivity and thermal conductivity, heat resistance, high strength and flexibility are uniformly obtained, and extensive use thereof is enhanced across various fields.

According to the second aspect of the invention, the carbon film contains a carbon nanotube with high density. Accordingly, the carbon film is formed on the surface of the work with high density and high integration, so that the outstanding characteristics of the carbon can be obtained.

According to the third aspect of the invention, the primary film is coated or impregnated thereon with a single or plural layers of carbon film, so that dense and reliable characteristics of the carbon can be obtained.

According to the fourth aspect of the invention, a basal part of the carbon film is disposed at the irregular part of the primary film. Accordingly, the carbon film is embedded reliably so as to exhibit the function of an anchor component, thereby forming the carbon film reliably and rigidly.

According to the fifth aspect of the invention, a secondary film containing a carbon nanotube is formed on the primary film, and the work, the primary film and the secondary film are integrated. Accordingly, the carbon nanotube or carbon is uniformly disposed thereon, so that the outstanding characteristics of the carbon are obtained.

According to the sixth aspect of the invention, the work comprises any one of stainless steel, nickel, iron, copper, aluminum, brass, other metals and alloys, synthetic resin, glass, ceramics, paper, fiber, and wood, which can deposit a suboxide or oxide containing metal ions, so that it can be applied to various raw materials.

According to the seventh aspect of the invention, the secondary film includes any one of a polymer material, an inorganic or organic paint coating, a functional material, or ceramics, which contains a carbon nanotube. Accordingly, the carbon nanotube is included in the various kinds of materials, so that the range of the secondary film is expanded.

According to the eighth aspect of the invention, the carbon film is coated or impregnated on the surface layer of the anodic oxide film of the work made from aluminum, and the carbon film is disposed at the hole part of the anodic oxide film. Accordingly, the anodic oxide film is given an outstanding electrical conductivity and thermal conductivity, heat resistance, high strength and flexibility owing to the characteristics of the carbon. Moreover, a novel and outstanding function of the anodic oxide film can be obtained.

According to the ninth aspect of the invention, the carbon film is disposed at the hole part of the anodic oxide film in such a manner as to coat an inner surface thereof and the hole part is sealed with the carbon film disposed therein. Accordingly, corrosion resistance of the hole part of the anodic oxide film can be obtained, and the same effect as in the case with the conventional hole sealing treatment can be obtained. Moreover, by using inexpensive equipment and simple work, the conventional hole sealing treatment can be substituted. In addition, it also enables coloring of the carbon film by black color.

According to the tenth aspect of the invention, a carbon film coating method for work comprises: coating or impregnating a carbon film on a surface layer part of a work, the work being capable of depositing a suboxide or oxide containing metal ions, coating a porous primary film on the surface layer part of the work by electrochemical action or chemical reaction; and coating or impregnating a carbon film on an irregular part of the surface layer part of the primary film. Accordingly, by virtue of the porous part or irregular part of the primary film, the carbon film is rigidly and densely coated or impregnated. Moreover, owing to the characteristics of the carbon, an outstanding electrical conductivity and thermal conductivity, heat resistance, high strength and flexibility are obtained, and extensive use thereof is enhanced across various fields.

According to the eleventh aspect of the invention, the carbon film contains a carbon nanotube with high density. Accordingly, the carbon film is formed on the surface part of the work with high density and high integration, so that the outstanding characteristics of the carbon can be obtained.

According to the twelfth aspect of the invention, a single or plural layers of carbon film is dipped, coated or absorbed to the primary film so that the primary film is coated or impregnated. Accordingly, the dense and reliable characteristics of the carbon film can be obtained.

According to the thirteenth aspect of the invention, a basal part of the carbon film is embedded in the irregular part of the primary film. Accordingly, the carbon film is arranged reliably so as to exhibit the function of an anchor component, so that the carbon film is formed reliably and rigidly.

According to the fourteenth aspect of the invention, a secondary film containing the carbon nanotube is formed on the primary film, and the work, primary film and secondary film are integrated. Accordingly, the outstanding characteristics of the carbon are obtained by uniformly disposing the carbon nanotube or carbon thereon.

According to the fifteenth aspect of the invention, the work includes any one of stainless steel, nickel, iron, copper, aluminum, brass, other metals and alloys, synthetic resin, glass, ceramics, paper, fiber, and wood, which can deposit a suboxide or oxide containing metal ions. Accordingly, it can be applied to various raw materials.

According to the sixteenth aspect of the invention, the secondary film includes any one of a polymer material, an inorganic or organic paint coating, a functional material, or ceramics, which contains the carbon nanotube. Accordingly, the carbon nanotube is included in the various kinds of materials, so that the range of the secondary film can be expanded.

According to the seventeenth aspect of the invention, a dispersing solvent of the carbon nanotube is prepared by adjusting the carbon nanotube to a predetermined ratio with respect to a dispersing agent, and the dispersing solvent is coated or blown to the surface layer of the primary film or the primary film is dipped in the dispersing solvent. Accordingly, the carbon film can be formed on the surface layer of the primary film by using a simple equipment and operation.

According to the eighteenth aspect of the invention, the carbon nanotube and dispersing agent are adjusted to 1:1 to 1:4. Accordingly, the dilution ratio between the carbon nanotube and the dispersing agent can be selected depending on working conditions.

According to the nineteenth aspect of the invention, the carbon film is coated or impregnated on the surface layer of the anodic oxide film of the work which is made from aluminum, and the carbon film is arranged by allowing the dispersing solvent of the carbon nanotube to invade into a hole part of the anodic oxide film. Accordingly, the anodic oxide film is given an outstanding electrical conductivity and thermal conductivity, heat resistance, high strength and flexibility owing to the characteristics of the carbon. Moreover, it can be obtained such an effect that a novel and outstanding function of the anodic oxide film.

According to the twentieth aspect of the invention, the carbon film is arranged to the hole part of the anodic oxide film in such a manner as to cover the inner surface thereof, or the hole part is sealed with the carbon film disposed at the inside thereof. Accordingly, corrosion resistance of the hole part of the anodic oxide film can be obtained, and the same effect as in the case with the conventional hole sealing treatment can be obtained. Moreover, by using inexpensive equipment and simple operation, the conventional hole sealing treatment can be substituted. In addition, it realizes the coloring of the carbon film by black color.

Effect of the Invention

According to the first aspect of the invention, a carbon film coating structure for a work comprises a work having a surface layer on which a carbon film is formed or impregnated, wherein the work can deposit a suboxide or oxide containing metal ions, a porous primary film is formed on the surface layer of the work, and a carbon film is coated or impregnated on an irregular part of the surface layer of the primary film. Accordingly, by virtue of the porous part or irregular part of the primary film, the carbon film is rigidly and densely coated or impregnated. Moreover, owing to the characteristics of the carbon, an outstanding electrical conductivity and thermal conductivity, heat resistance, high strength and flexibility are obtained, and extensive use thereof is enhanced across various fields.

According to the second aspect of the invention, the carbon film contains a carbon nanotube with high density. Accordingly, it can be obtained such an effect that the carbon film is formed on the surface of the work with high density and high integration, so that the outstanding characteristics of the carbon can be obtained.

According to the third aspect of the invention, the primary film is coated or impregnated thereon with a single or plural layers of carbon film. Accordingly, dense and reliable characteristics of the carbon can be obtained.

According to the fourth aspect of the invention, a basal part of the carbon film is disposed at the irregular part of the primary film. Accordingly, the carbon film is embedded reliably so as to exhibit the function of an anchor component, so that the carbon film is formed reliably and rigidly.

According to the fifth aspect of the invention, a secondary film containing a carbon nanotube is formed on the primary film, and the work, the primary film and the secondary film are integrated. Accordingly, the outstanding characteristics of the carbon are obtained by uniformly disposing the carbon nanotube or carbon thereon.

According to the sixth aspect of the invention, the work comprises any one of stainless steel, nickel, iron, copper, aluminum, brass, other metals and alloys, synthetic resin, glass, ceramics, paper, fiber, and wood, which can deposit a suboxide or oxide containing metal ions. Accordingly, it can be applied to various raw materials.

According to the seventh aspect of the invention, the secondary film includes any one of a polymer material, an inorganic or organic paint coating, a functional material, or ceramics, which contains a carbon nanotube. Accordingly, the carbon nanotube is included in the various kinds of materials, so that the range of the secondary film can be expanded.

According to the eighth aspect of the invention, the carbon film is coated or impregnated on the surface layer of the anodic oxide film of the work made from aluminum, and the carbon film is disposed at the hole part of the anodic oxide film. Accordingly, the anodic oxide film is given an outstanding electrical conductivity and thermal conductivity, heat resistance, high strength and flexibility owing to the characteristics of the carbon. Moreover, it can be obtained such an effect that a novel and outstanding function of the anodic oxide film.

According to the ninth aspect of the invention, the carbon film is disposed at the hole part of the anodic oxide film in such a manner as to coat an inner surface thereof and the hole part is sealed with the carbon film disposed therein.

Accordingly, corrosion resistance of the hole part of the anodic oxide film can be obtained, and the same effect as in the case with the conventional hole sealing treatment can be obtained. Moreover, by using inexpensive equipment and simple work, the conventional hole sealing treatment can be substituted. In addition, it realizes the coloring of the carbon film by black color.

According to the tenth aspect of the invention, a carbon film coating method for work comprises coating or impregnating a carbon film on a surface layer part of a work, the work being capable of depositing a suboxide or oxide containing metal ions, coating a porous primary film on the surface layer part of the work by electrochemical action or chemical reaction; and coating or impregnating a carbon film on an irregular part of the surface layer part of the primary film. Accordingly, by virtue of the porous part or irregular part of the primary film, the carbon film can be rigidly and densely coated or impregnated. Moreover, owing to the characteristics of the carbon, an outstanding electrical conductivity and thermal conductivity, heat resistance, high strength and flexibility can be obtained, and extensive use thereof can be enhanced across various fields.

According to the eleventh aspect of the invention, the carbon film contains a carbon nanotube with high density. Accordingly, the carbon film can be formed on the surface part of the work with high density and high integration, so that the outstanding characteristics of the carbon are obtained.

According to the twelfth aspect of the invention, a single or plural layers of carbon film is dipped, coated or absorbed to the primary film so that the primary film is coated or impregnated. Accordingly, the dense and reliable characteristics of the carbon film can be obtained.

According to the thirteenth aspect of the invention, a basal part of the carbon film is embedded in the irregular part of the primary film. Accordingly, the carbon film can be arranged reliably so as to exhibit the function of an anchor component, so that the carbon film is formed reliably and rigidly.

According to the fourteenth aspect of the invention, a secondary film containing the carbon nanotube is formed on the primary film, and the work, primary film and secondary film are integrated. Accordingly, the outstanding characteristics of the carbon can be obtained by uniformly disposing the carbon nanotube or carbon thereon.

According to the fifteenth aspect of the invention, the work includes any one of stainless steel, nickel, iron, copper, aluminum, brass, other metals and alloys, synthetic resin, glass, ceramics, paper, fiber, and wood, which can deposit a suboxide or oxide containing metal ions. Accordingly, it can be applied to various raw materials.

According to the sixteenth aspect of the invention, the secondary film includes any one of a polymer material, an inorganic or organic paint coating, a functional material, or ceramics, which contains the carbon nanotube. Accordingly, the carbon nanotube is included in the various kinds of materials, so that the range of the secondary film can be expanded.

According to the seventeenth aspect of the invention, a dispersing solvent of the carbon nanotube is prepared by adjusting the carbon nanotube to a predetermined ratio with respect to a dispersing agent, and the dispersing solvent is coated or blown to the surface layer of the primary film or the primary film is dipped in the dispersing solvent. Accordingly, the carbon film can be formed on the surface layer of the primary film by using a simple equipment and operation.

According to the eighteenth aspect of the invention, the carbon nanotube and dispersing agent are adjusted to 1:1 to 1:4. Accordingly, the dilution ratio between the carbon nanotube and the dispersing agent can be selected depending on working conditions.

According to the nineteenth aspect of the invention, the carbon film is coated or impregnated on the surface layer of the anodic oxide film of the work which is made from aluminum, and the carbon film is arranged by allowing the dispersing solvent of the carbon nanotube to invade into a hole part of the anodic oxide film. Accordingly, the anodic oxide film can be given an outstanding electrical conductivity and thermal conductivity, heat resistance, high strength and flexibility owing to the characteristics of the carbon. Moreover, a novel and outstanding function of the anodic oxide film can be obtained.

According to the twentieth aspect of the invention, the carbon film is arranged to the hole part of the anodic oxide film in such a manner as to cover the inner surface thereof, or the hole part is sealed with the carbon film disposed at the inside thereof. Accordingly, corrosion resistance of the hole part of the anodic oxide film can be obtained, and the same effect as in the case with the conventional hole sealing treatment can be obtained. Moreover, by using inexpensive equipment and simple operation, the conventional hole sealing treatment can be substituted. In addition, it can realize the coloring of the carbon film by black color.

BRIEF DESCRIPTION OF THE DRAWINGS

FIGS. 3(a) and 3(b) are sectional views showing, in an enlarged scale, important parts of FIG. 2, wherein FIGS. 3(a) and 3(b) show works having different surface states.

FIG. 8 is a schematic diagram showing, in a more enlarged scale, the bent part of FIG. 7.

FIG. 9 is a sectional view showing, in an enlarged scale, an overview of a state of a film formation, which is a conventional secondary film

FIGS. 16 (a) through 16 (d) is a photograph of SEM showing, in an enlarged scale, the first surface state according to the second embodiment, in which the surface state and the dispersing state of CNT after the sample A is dipped for a predetermined period of time in a dispersing agent of CNT obtained by adjusting CNT and a dispersing agent to 1:1, are shown in an enlarged scale.

FIGS. 17 (a) through 17 (d) is a photograph of SEM showing, in an enlarged scale, the second surface state according to the second embodiment, in which the surface state and the dispersing state of CNT after the sample B is dipped for a predetermined period of time in a dispersing solvent of CNT obtained by adjusting CNT and a dispersing agent to 1:2, are shown in an enlarged scale.

FIGS. 18 (a) through 18 (d) is a photograph of SEM showing, in an enlarged scale, the third surface state according to the second embodiment, in which the surface state and the dispersing state of CNT after the sample C is dipped for a predetermined period of time in a dispersing solvent of CNT obtained by adjusting CNT and a dispersing agent to 1:4, are shown in an enlarged scale.

FIGS. 19 (a) through 19 (d) is a photograph of SEM showing, in an enlarged scale, the fourth surface state according to the second embodiment, in which the surface states of a central part of the sample A and a distal end part of the sample D, and the dispersing state of CNT are shown in an enlarged scale.

FIGS. 23(a) through 23(d) is a sectional view showing an important part of a production process of the third embodiment of the present invention, FIG. 23(a) showing a state in which a work with a primary film formed thereon is dipped into a bath receiving a dispersing solvent of CNT, FIG. 23(b) showing a state in which the work is pulled up from the bath, and FIG. 23(c) showing a state in which the work is dried.

FIGS. 24(a) through 24(c) is a sectional view showing an important part of a production process of the fourth embodiment of the present invention, FIG. 24(a) showing a state in which an aluminum work with an anodic oxide film formed thereon is dipped into a bath receiving a dispersing solvent of CNT, FIG. 24(b) showing a state in which the work is pulled up from the bath, and FIG. 24(c) showing a state in which the work is dried.

DETAILED DESCRIPTION OF THE INVENTION

Figure 1:
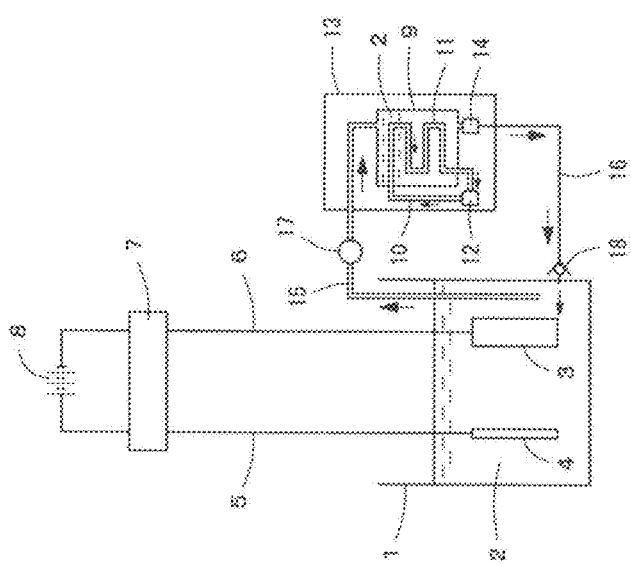
FIG. 1 is an explanatory view showing a basic form of the present invention and showing a state in which a primary film is deposited on a work by an electrochemical device.

A basic form of the present invention will now be described with reference to the drawings, in which a primary film is formed on a surface of a work or component to be treated made of stainless steel, and then a secondary film is formed on the primary film, by an electrochemical equipment. In FIGS. 1 through 9, reference numeral 1 denotes a bath, which receives a treatment liquid 2 or electrolyte therein.

The treatment liquid 2 has the same structure as a black chrome bath, and the composition thereof includes 300 to 400 g/l of chromic anhydride $CrO_3$, 5 to 10 g/l of sodium silicofluoride $NaSiF_6$, and 2 to 5 g/l of barium acetate $C_4H_6O_4Ba$. The bath temperature of the treatment liquid 2 is adjusted to 10° C. or below by using a cooling apparatus, as later described, to promote deposition of the suboxide of chromium suboxide $CrO_3$, as a primary film on the surface of the work 3 and to inhibit deposition of metal chromium Cr.

In this case, in order to deposit a predetermined suboxide, the bath temperature should preferably be adjusted to 0° C. or below so that the treatment liquid 2 is not frozen. In the basic form, the temperature is adjusted from −5 to 10° C. The work 3 which is a cathode piece, a metal chromium or an anode piece 4 which is a soluble electrode, and a carbon or lead which is an insoluble electrode are soaked and placed in the treatment liquid 2. Wirings 5, 6 for applying a positive and negative voltage are connected to the above components. A voltage is applied from a power unit 8 via a controller unit 7 having a function of rectification. These units adjust the current density of the work 3 and the anode piece 4 to 20 $A/dm^2$.

In the basic form, a stainless steel plate (SUS304) having a thickness of 0.5 mm is used as the work 3, but the work may not be limited to a metal piece and it may be any one of nickel, iron, copper, aluminum, brass, other metals, alloy, synthetic resin, glass, ceramics, paper, fiber, or wood on which an oxide or a suboxide may be deposited.

A cooling bath 9 for receiving a predetermined amount of the treatment liquid 2 is placed in the peripheral position of the bath 1, and a refrigerant pipe 11 of the cooling apparatus 10 is provided in the cooling bath 9 in a zigzag or coil-like pattern.

In the drawings, reference numeral 12 denotes a compressor for circulating a refrigerant provided in a cooling circuit of the cooling apparatus 10, reference numeral 13 denotes a cooling cylinder for storing the cooling bath 9, and reference numeral 14 denotes a filter inserted in a drain passage at the lower end of the cooling bath 9.

A treatment-liquid introduction pipe 15 is provided at the upper position of the cooling bath 9 and a treatment-liquid discharge pipe 16 is provided at the lower part of the cooling bath 9. One end of the treatment-liquid introduction pipe 15 is provided, in a submerged manner, into the treatment liquid 2 in the bath 1, and a liquid feed pump 17 for sucking the treatment liquid 2 is inserted in the treatment-liquid introduction pipe 15. Further, one end of the treatment-liquid discharge pipe 16 is connected to the filter 14 and the other end thereof is connected to the lower part of the bath 1 via a check valve 18.

Figure 4:
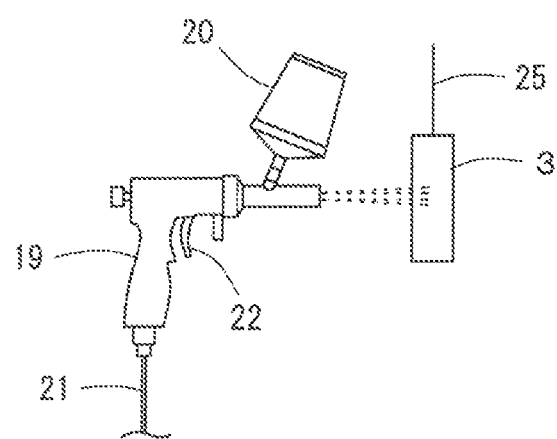
FIG. 4 is an explanatory view showing a state in which a secondary film is sprayed to a primary film of the work according to a spraying method employed to the present invention.

FIG. 4 shows a state in which an oxide composed of a low temperature black chrome (hereinafter referred to as "CBC"), which is the primary film, is deposited on the work 3 and then a coating is formed by spraying a synthetic resin paint, which is the secondary film, on the primary film. Reference numeral 19 denotes a small coating gun used for spraying. The coating gun 19 includes a cylindrical paint tank 20 provided to stand obliquely at the side of the nozzle of the coating gun 19 and a compressed air conduit 21 connected to the lower part of the coating gun 19.

Then, a paint in the paint tank 20 is readily sprayable onto the primary film 23 deposited on the work 3 via operation of a trigger 22. In the basic form, chromium suboxide $CrO_3$ is deposited on the work 3 as the suboxide which is the primary film 23.

Other methods for forming the coating which is the secondary film include: a method for applying with the use of a brush or roller; a baking finish technique in which a paint is heated and hardened; a dip coating technique in which the work 3 with the primary film is dipped in the paint; an electrodeposition coating technique in which the work 3 in a water paint is coated by applying static electricity of opposite polarity; and an electrostatic coating technique in which a coating is electrically adsorbed on the work 3 by charging the work 3 and a spray-form paint with opposite polarity. Out of those processes or techniques, the best one may be selected in accordance with the working conditions.

Next, the suboxide which is the primary film 23, or chromium oxide $Cr_2O_3$ which is the oxide of the suboxide is firstly deposited on the work 3. Then the coating which is the secondary film 24 is formed on the primary film 23.

When the suboxide which is the primary film 23, or chromium oxide $Cr_2O_3$ which is the oxide of the suboxide is deposited on the work 3, and then a coating which is the secondary film 24 is formed on the primary film 23.

Firstly, when a suboxide which is the primary film 23 and a chromium oxide $Cr_2O_3$, which is the oxide or the suboxide, are to be deposited on the work 3, the bath 1 for receiving the treatment liquid 2, the work 3 which is a cathode piece, and the anode piece 4 is prepared and then a predetermined voltage is applied to the work 3 and the anode piece 4. The power unit 8 which is capable of exerting a predetermined current density thereto and the controller unit 7 for controlling the power unit 8 are mounted on the above components. Further, the cooling bath 9 is placed in a position adjacent to the bath 1.

The cooling bath 9 is equipped with the cooling apparatus 10 and the refrigerant pipe 11 is provided in the cooling bath 9. The treatment liquid introduction pipe 15 is provided at the upper position of the cooling bath 9 and the treatment liquid discharge pipe 16 is provided at a lower part of the cooling bath 9. The liquid feed pump 17 is inserted in the treatment liquid introduction pipe 15. One end of the treatment liquid introduction pipe 15 is provided in the treatment liquid 2 in the bath 1, and one end of the treatment liquid discharge pipe 16 is connected to the lower part of the bath 1 via the check valve 18.

The treatment liquid 2 is then prepared. The treatment liquid 2 has the composition of 300 to 400 g/l of chromic anhydride $CrO_3$, 5 to 10 g/l of sodium silicofluoride $NaSiF_6$ which is a reduction inhibitor, and 2 to 5 g/l of barium acetate $C_4H_6O_4Ba$, and the treatment liquid 2 is received in the bath 1.

In this case, sodium silicofluoride and barium acetate in the treatment liquid 2 inhibit a flow of electricity, inhibiting deposition of metal chromium Cr on the surface of the work 3 and promoting deposition of chromium suboxide $CrO_3$ which is the suboxide.

The work 3 and the anode piece 4 are received in the bath 1, the wirings 5, 6 thereof are connected to the controller unit 7 and the power unit 8. The power unit 8 is turned on to apply a predetermined voltage, and the current density of the work 3 and the anode piece 4 is adjusted via the controller unit 7. In this basic form, the current density of the work 3 and the anode piece 4 is adjusted to 20 $A/dm^2$.

Then, the liquid feed pump 17 is started to suck the treatment liquid 2 in the bath 1 and the treatment liquid 2 sucked is sent to the cooling bath 9. Further, the cooling apparatus 10 is started to drive the compressor 12 and circulate the refrigerant to the refrigerant pipe 11. The treatment liquid 2 in the cooling bath 9 is then cooled and sent to the lower part of the bath 1 from the treatment liquid discharge pipe 16.

In this way, the treatment liquid 2 in the bath 1 is cooled and, in the basic form, the bath temperature is adjusted to 10° C. or below. In this case, in order to deposit a predetermined suboxide, the bath temperature should preferably be adjusted to 0° C. or below so that the treatment liquid 2 is not frozen. In the basic form, the temperature is adjusted from −5 to 10° C.

In this way, when voltage is applied to the work 3 and the anode piece 4, hydrogen gas is generated on the side of the work 3 and moved up in the treatment liquid 2 and then released into the atmosphere, while oxygen gas is generated on the side of the anode piece 4 and moved up in the treatment liquid 2 and then released into the atmosphere.

Chromic anhydride, which is the main component of treatment liquid 2, is ionized at the anode piece 4, and the chromate ions are separated from the anode piece 4. The separated chromate ions are moved and dispersed in the treatment liquid 2 and moved toward the interface of the work 3. Then, the chromate ions are reduced to trivalent chromium. The trivalent chromium is deposited on the interface of the work 3.

At that time, trivalent chromium is deposited on the interface of the work 3 based on the metal Cr. The deposited metal Cr is coupled with chromium suboxide $CrO_3$ which is the suboxide 23, and then the metal Cr and chromium suboxide are adhered thereon in sequence to form a suboxide film. When the thickness of the film reaches 1 to 2 μm, conductivity of the suboxide film is lost and formation of the suboxide is stopped thereafter The chromium suboxide film has semi-gross black color and a thin film with a thickness of 1 to 2 μm. Thereafter, the chromium suboxide film is combined with oxygen in the atmosphere and changed into an oxide of $Cr_2O_3$, thus making the more rigid primary film.

When depositing the suboxide film, the bath temperature is adjusted to such a low temperature as 10° C. or below. In the basic form, the temperature is adjusted to such a range as from −5 to 10° C. The current is inhibited by sodium silicofluoride and barium acetate in the treatment liquid 2. Further, since the current density of the work 3 and the anode piece 4 is set to 20 $A/dm^2$, deposition of metal chromium Cr on the work 3 can be inhibited.

Thus, the primary film 23 composed of the suboxide is presumed to be softer than the metal Cr and have a lower conductivity.

The inventor of the present invention checked the components of the deposited suboxide film by quantitative analysis using an Electron Probe Micro Analyzer (EPMA 1720) of SHIMAZU CORPORATION. The following data was obtained: C: 24.91%; O:18.82%; Si: 35.75%; Cr: 11.16%; and Ni: 9.36%. This data shows that deposition of Cr is inhibited.

Next, the present inventor checked the surface state of the primary film 23 using a super resolution field emission type scanning electron microscope (SU-10) of Hitachi High-Technologies Corporation. The same results were obtained as those shown in FIGS. 3(a) and 3(b) through 8 and 11 of JP-A-2017-1312.

Figure 3A:
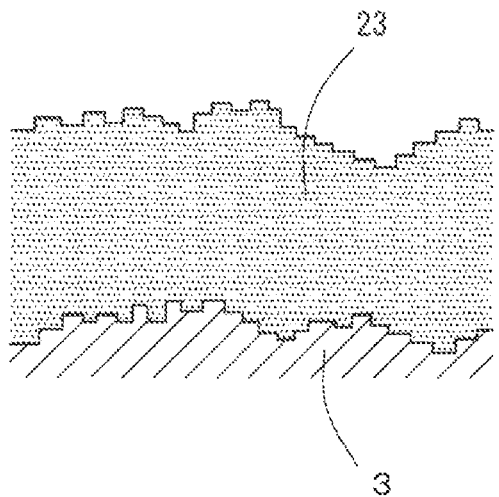
Figure 3B:
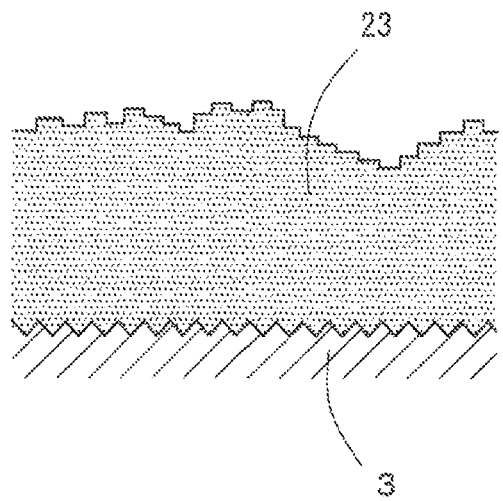

Among them, FIGS. 3(a) and 3(b) are photograph images of the surface states after 5 minutes, 10 minutes, and 20 minutes from the initiation of deposition of the suboxide which is the primary film 23 at the bath temperature of −5° C. and the current density of 20 A/dm$^2$, with magnification of 10K, 20K, 50K, and 100K (K: ×1000). Plural masses or granular structures appear on each state, and these structures grow as time passes from the deposition and clearances thereof also increase. It was observed that irregularities were distributed and clearly formed.

FIG. 4 is photograph images of the surface states after 5 minutes, 10 minutes, and 20 minutes from the initiation of deposition of the suboxide which is the primary film 23 at the bath temperature of 15° C. and the current density of 20 A/dm$^2$, with magnification of 10K, 20K, 50K, and 100K. Plural grains or scale-like structures appear on each state, and these structures increase and grow as time passes from the deposition and clearances thereof also increase. Thus, distribution of irregularities was observed.

Figure 5:
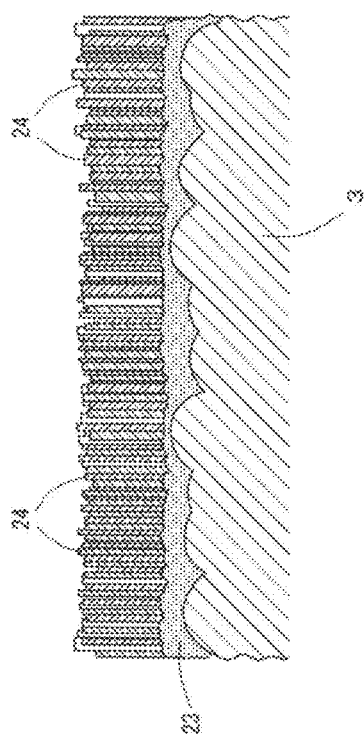
FIG. 5 is a sectional view schematically showing a state in which the secondary film is formed on the primary film after a suboxide as the primary film is deposited on the work.

FIG. 5 is a photograph image of the surface state after 20 minutes from the initiation of deposition of the primary film 23 at the bath temperature of −5° C., with a magnification of 100K. The size of the masses or granular structures are shown with a reference scale for comparison. The masses or granular structures with the size of 25 to 200 nm were observed.

Figure 6:
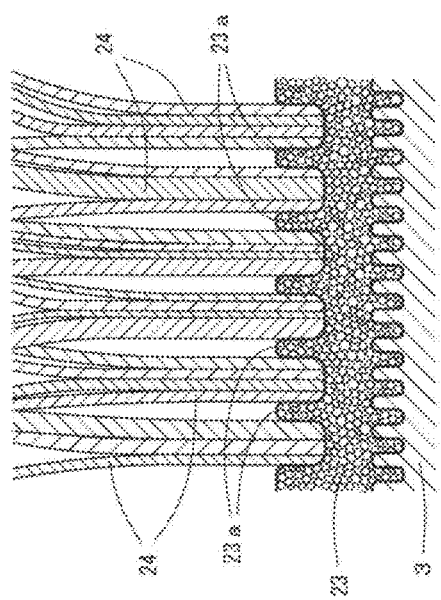
FIG. 6 is an explanatory view showing, in an enlarged scale, the important part of FIG. 5, in which the irregularities of the surface of the primary film function like a chopstick stand and a basal part of the secondary film is embedded in the irregularities.

FIG. 6 is a photograph image of the surface state after 20 minutes from the initiation of deposition of the suboxide at the bath temperature of 15° C., with magnification of 100K. The size of the structures of grains or folds is shown with a reference scale for comparison. The structures of grains or folds with the width of 25 to 50 nm and the length of 400 to 650 nm were observed.

Figure 7:
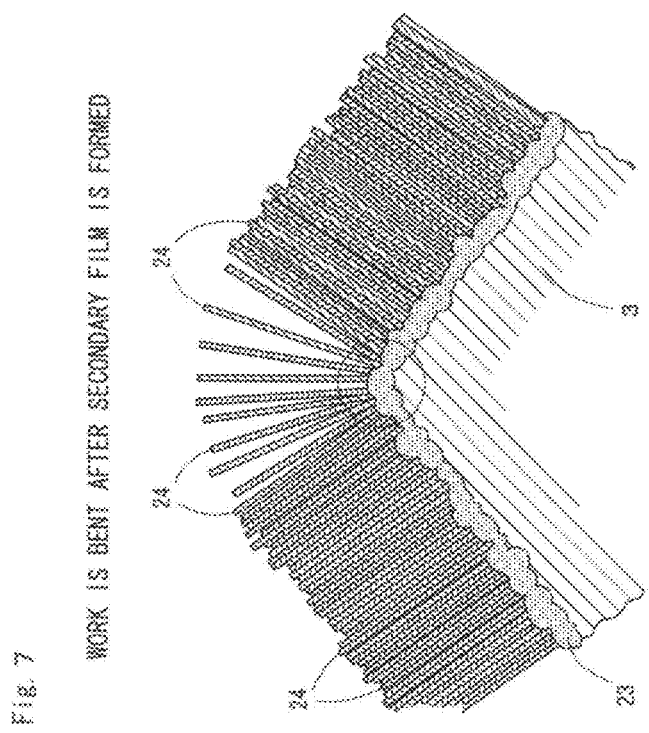
FIG. 7 is a sectional view schematically showing, in an enlarged scale, a state of the work which is bent after the secondary film is embedded

Additionally, FIG. 7 includes photograph images of the surface state of FIG. 5, taken by a scanning microscope, with a magnification of 10 to 50K. It was observed that the suboxide film had a fine-porous structure, the surface was formed like a cake with minute irregularities or sponge, and the surface had many irregularities with the size of 50 to 200 nm.

FIG. 8 shows a photograph image of a cross section of the suboxide or the primary film 23 in FIG. 3 of the publication. It was observed that minute irregularities were formed on the surface of the primary film 23 covering the surface of the work 3.

Figure 2:
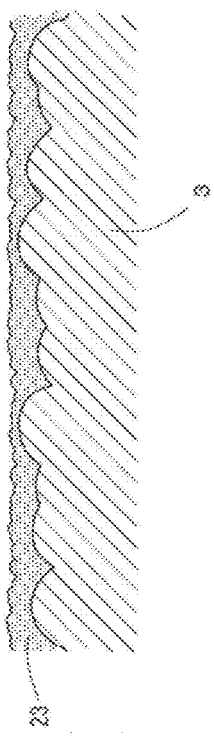
FIG. 2 is a sectional view showing, in an enlarged scale, an impregnating state when a suboxide as a primary film is deposited on a surface of the work.

As seen from the above, the surface of the work 3 may be represented schematically as shown in FIG. 2. As shown in FIG. 3 (a), 3 (b), which is further enlarged images of FIG. 2, since various irregularities and serrations formed on the surface of the work 3 are engaged with the irregularities of the porous primary film 23, the primary film 23 seems to be adhered and deposited on the work 3 intimately.

Figure 11:
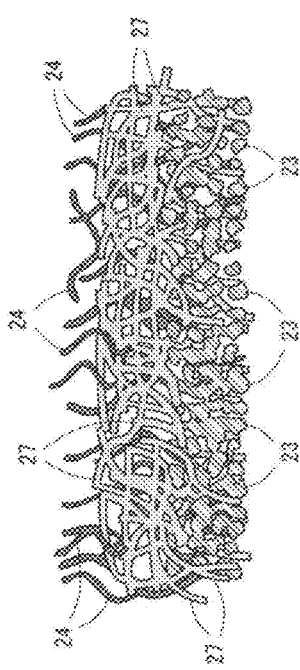
FIG. 11 is a sectional view schematically showing, in an enlarged scale, the important part of FIG. 10.

This state is shown, in a further enlarged scale, in FIG. 11 of the publication. The primary film 23 is arranged in a stripe pattern with predetermined intervals and engaged with the surface layer of the work 3 so that the primary film 23 is adhered to the work 3 firmly.

In other words, an impregnation layer made of the primary film 23 is formed on the surface of the work 3 so that the work 3 is integral with the primary film 23. Accordingly, the primary film 23 is adhered to the surface layer of the work 3 rigidly and intimately, thus preventing the primary film 23 from peeling and cracking. Further, the secondary film 24 is formed on the porous structure of the primary film 23 firmly and rigidly so that peeling of the secondary film 24 is prevented.

Next, in the case of forming a coating, which is the secondary film 24, on the work 3, inorganic or organic paint coating is applied or adsorbed onto the suboxide or oxide deposited on the work 3.

In the basic form, a spraying method of coating with the coating gun 19 is adopted as an applying or adsorbing method of the coating, but other techniques may also be adopted.

In this case, since oxygen has the capability to penetrate the coating, the coating may be formed immediately after formation of the primary film 23 or formed later on. Ultimately, as long as it only has to form a coating on the rigid oxide, the timing of the coating formation has nothing to do with the quality.

Thus, the surface of the suboxide or oxide of the primary film 23 deposited on the work 3 before forming the coating is cleaned and dried. The work 3 is suspended on, for example, an appropriate jig 25.

Then a desired paint is filled in the paint tank 20 of the coating gun 19. By holding the coating gun 19 with the compressed-air duct 21 connected to a lower part thereof, the paint is sprayed via an operation of the trigger 22, aiming the nozzle toward the work 3. This state is shown in FIG. 4.

In this way, the paint applied to the work 3 in the manner as described above is adhered to the surface of the primary film 23 of the suboxide or oxide, and then dried by heating and hardening. In this case, the forming state of the coating, which is the secondary film 24, is shown in FIGS. 5 and 6.

More specifically, when forming the coating of the secondary film 24, the thin primary film 23, which is the suboxide or oxide deposited on the work 3, is used instead of primers that have been frequently used for conventional coating. Every fine particle or crystal of the coating is disposed on the primary film 23 independently and with high density.

At that time, the coating needs to be formed basically only once, and such time and labor consuming operation as under coating, intermediate coating and top coating, that are required in the conventional technique, is no more required. The film is formed thin, having a thickness of 5 μm, which is one-fifth to one-third of the conventional ones. The thin film is engaged with the minute irregularities of the primary film 23 so as to achieve an intimate adhesion. Thus, the amount of the paint used is reduced and the coating is formed more rapidly compared with the conventional coating method, and whereby the coating is formed in a rational manner and at low cost.

In this case, by virtue of the porous structure of the primary film 23, the plural irregularities or holes of the surface function like a chopstick holder, and a coating, which is the secondary film 24, is converged and embedded among the irregularities or holes. Accordingly, the arrangement density of the coating can be adjusted by the holes, polymer chains of the synthetic resin coating can be adjusted, and thereby distributing the secondary film 24 with high density and adhering the secondary film 24 firmly onto the irregularities and holes.

An impregnation layer of the secondary film 24 is formed on the surface layer of the primary film 23. Since the secondary film 24 is integral with the primary film 23, the secondary film 24 is prevented from peeling. The porous structure of the primary film makes the secondary film 24 to be adhered firmly and rigidly.

As described above, in the basic form, the impregnation of the work 3 and the primary film 23, and the impregnation of the primary film 23 and the secondary film 24 promote integration thereof. Accordingly, since they are adhered firmly and rigidly, peeling and cracking thereof can be prevented even when the primary film 23 and secondary film 24 are bent.

Moreover, since the suboxide or oxide has insulation properties, so that a current does not pass through the work 3 via the suboxide or oxide even when the coating is made thinner. As a result, corrosion due to potential difference does not occur, thereby improving corrosion resistance.

Furthermore, since the primary film 23 is porous and flexible, the fine particles of the coating easily enter and byte into the work 3, and disengagement from the work 3 is prevented. The film is reliably embedded and functions like an anchor component so that the coating is formed firmly and rigidly. Connection with the other coating applied thereon is also promoted to form the coating in a rational manner.

In addition, since grains and crystals of the coating are respectively disposed independently and with high density, even when a stress is applied to a part of the grains and crystals, the rest of the grains and crystals is not affected. Thus, when the work 3 is bent as shown in FIGS. 7 and 8 after formation of the coating, the stress is dispersed. Further, peeling or cracking of the coating does not occur even when the surface of the coating is damaged.

Thus, the work 3 with the coating already formed thereon has a good workability, and is preferably subjected to various processing techniques. The surface of the coating was cut in a lattice pattern, and peeling of a cross-cut piece was tested. No peeling was observed and the coating with high adhesion was observed.

On the other hand, FIG. 9 shows the outline of a state of the formation of a conventional coating 24. The grains and crystals of the coating 27 are disposed loosely and with low density. To prevent corrosion caused by potential difference, such as pinholes, a very thick coating having a thickness of, for example, 50 to 100 μm, is required. Such coating is formed by applying the primer 26 to the work 3 and then applying the coating 24 in layers.

Accordingly, the above coating process requires much time and labor, and the amount of paint used is also increased, whereby the working cost is increased. As described above, the grains and crystals of the coating 24 are not independent and loosely disposed at low density, so that when a stress is applied to a part of the grains and crystals, it is also prevailed to the rest of the grains and crystals. When the work 3 is bent or the surface of the coating is damaged after formation of the coating, the coating 27 is peeled off and cracked, thus resulting in poor workability.

In the above-mentioned basic form, an electroplating technique based on the electrochemical action is adopted as a deposition method of the primary film 23 on the work 3. Other deposition techniques that can be applied include an electroless plating. If additives such as nickel sulfate which is an agent for supplying metal ions, sodium hypophosphite which is a reducing agent, and powder ceramics are added in the composition of the treatment liquid 2 in the electroless bath, deposition of the suboxide or oxide, or ceramics can be promoted by using simple equipment compared with the equipment for electrochemical action.

In the above-mentioned basic form, the secondary film 24 is used as a coating, but a functional material, ceramics, Teflon (registered trademark), or fluorine may be used instead of the coating.

Among them, as the functional materials, there may be used, for example, a polymer material, difluoride material, tetrafluoride material, fluorine compound, titanium dioxide, zinc oxide, manganese dioxide, alumina, bentonite, hydroxyapatite, zeolite, talc, collimate, porous silica, gold, platinum, palladium, boron nitride, titanium nitride, aluminum nitride, DLC, magnetic material, metallic material, and carbon material. They may be used on the surface and the interface of the primary film 23 or intervened inside the primary film 23 so that corrosion resistance, adsorptive properties, abrasion resistance, catalytic properties, thermal conductivity, low friction properties, and antibiotic properties of the primary and secondary films 23, 24 are improved in functionality.

In view of the above, the present inventor came up with an idea as the first embodiment, in which a ceramics film (hereinafter referred to as "CB film"), which is the secondary film 24, is impregnated or coated with CNT.

Specifically, since the CB film realizes a highly integrated structure like paint, the single layer SWNT type CNT, which is similar to the paint's polymeric material, is also expected to exhibit the previously-mentioned anchor structure. So, it is attempted to form the CNT film on the CB film, so that other functional materials and paints are integrated, thereby enabling to provide a novel surface treatment method for a CNT contained film which was conventionally never obtainable.

Figure 10:
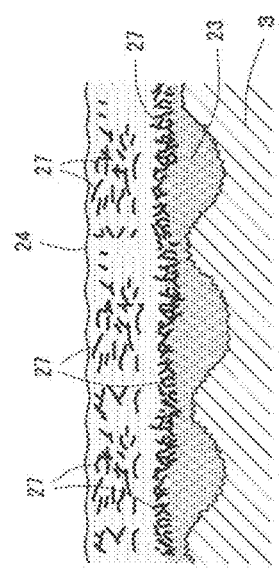
FIG. 10 is a sectional view showing the concept of a novel surface treatment process according to the first embodiment of the present invention.

FIGS. 10 and 11 are a conceptual diagram showing the novel surface treatment method for a film containing CNT according to the first embodiment of the present invention. The first film 23 is formed in the irregular part of the surface of the work 3, CNT 27 are arranged with high density on the surface of the primary film 23, and a paint of a polymeric material, which is a functional material, is coated on the primary film 23.

The paint of the secondary film 24 contains 5% of the CNT 27 which comprises a multilayer CNT (MWNT) and has a diameter of 10 to 15φnm and a length of about 10 μm. This CNT 27 is disposed at the irregular part or porous part among the crystals 28 on the surface of the primary film 23. This state shown in FIG. 12.

Figure 13:
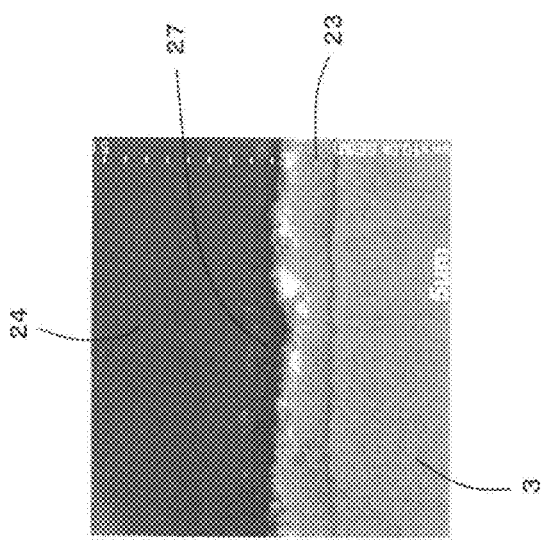
FIG. 13 is a sectional view showing, in an enlarged scale, a composite film of the primary film and CNT according to the novel surface treatment process.

FIG. 13 is a sectional view of a composite film of the primary film 23 and CNT 27. Approximately 1 to 1.5 μm of the primary film 23 is formed on the surface of the work 3, and approximately 1 μm of the CNT 27 is formed on the surface of the primary film 23.

Figure 14:
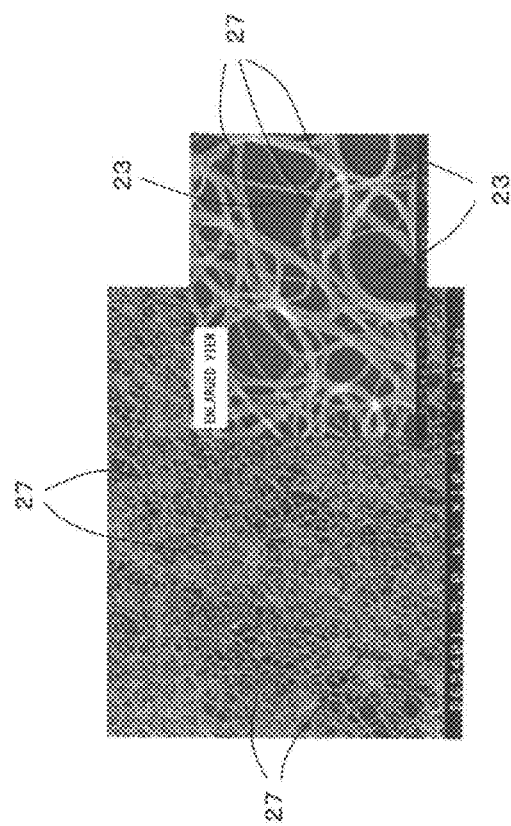
FIG. 14 is an enlarged photograph of a distribution state of CNT according to the novel surface treatment process, in which a SEM photograph showing a part of the foregoing is also shown in a more enlarged scale.

FIG. 14 is a composition chart showing, in a plan view, the distributing state of the CNT 27, wherein the CNT 27 is complicatedly arranged in a mesh pattern, a part of which is shown in an enlarged scale.

Figure 12:
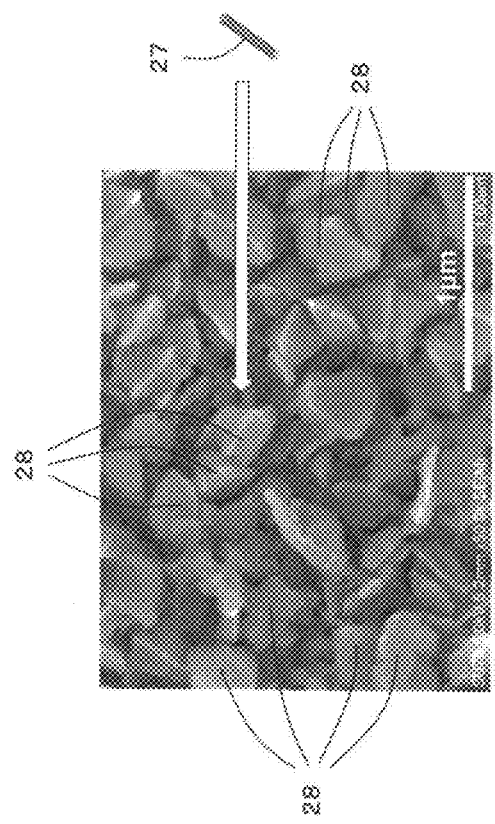
FIG. 12 is an SEM photograph showing, in an enlarged scale, a crystal structure of the primary film according to the novel surface treatment process, in which CNT is inserted among the crystals.

In this way, the primary film 23 is firmly engaged with the irregular part of the surface of the work 3, the CNT 27 is arranged on the surface of the primary film 23 with high density, the paint of the polymeric material, which is the secondary film 24 containing the CNT 27, is coated on the primary film 23 (FIGS. 10 and 12), and the CNT 27 is engaged with the irregular part or porous part among the crystals 28 of the surface of the primary film 23 such that the primary film 23 and the composite film of the CNT 27 are integrally formed (FIGS. 12 to 14).

Accordingly, there is almost no affinity between the primary film 23 and CNT 27. It was observed that the primary film 23 and the paint of the polymeric material, which is the second film 24, realize the highly integrated structure similar to the one already mentioned above.

In a second thought, the present inventor came up with the idea as the second embodiment, in which a carbon material, instead of the paint, is selected as the functional material and CNT, for example, is used as this carbon material, and secondary film 24 is applied to the carbon film.

In that case, first, it is necessary to select CNT having good compatibility with the primary film 23. Therefore, a single layer CNT (SWNT) or multi-layer CNT (MWNT), or dual layer (DWNT) were selected. In addition, the CNT, fullerene or graphene was selected as a structure of nanocarbon.

In this second embodiment, the multilayer CNT (MWNT) was selected. The selected CNT had the shape dimensions of 10 to 15φnm in diameter, about 10 μm in length, and 95% or higher in purity. As a dispersing agent (NMP) for this CNT, dichlorobenzene which is a solvent having a low vaporization point and easy to dry is used, so that the bundle of CNTs is efficiently dispersed.

At that time, content ratio (dilution ratio or adjustment ratio) between CNT and dispersing agent (NMP) is selected to 1:1, 1:2, and 1:4. Out of them, the best dilution ratio is selected, so that CNT is efficiently dispersed.

In addition to the dispersing agent, isopropyl alcohol, acetone, ethyl alcohol can be used.

Figure 15:
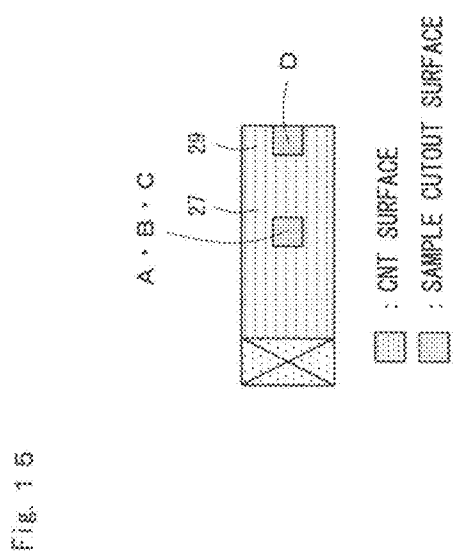
FIG. 15 is an explanatory view showing a production state of the sample piece used in the second embodiment of the present invention, in which the work with the primary film formed thereon is dipped in a dispersing solvent containing CNT to produce a sample piece, and a central part and a distal end part thereof are cut out to obtain a sample piece.

Thus, the present inventor tested the acceptability of the affinity between the primary film 23 and CNT depending on the dilution ratio. For that purpose, the CNT 27 and dispersing agent (NMP) were adjusted to 1:1, 1:2 and 1:4 in order to prepare various dispersing agents of the CNT 27. Then, a sample piece 29 obtained by forming the primary film 23 on both surfaces of the work 3 in the manner as mentioned above was dipped therein for 10 seconds. After pulling up, the central part and the distal end part of the sample piece 29 were cut into a rectangular shape of about 5 mm (FIG. 15), and the resultant was fixed onto an SEM (scanning electron microscope) sample stand (not shown). Then, the dispersing state and surface composition of CNT by way of location were observed.

At that time, the dispersing state and the surface composition of the CNT was observed under the condition of acceleration voltage 30 kv using SEM (JEOL Ltd., JSM-6510) after an osmium membrane of about 15 A was coated using the osmium coater (Neoc-STB manufactured by Meiwa Forsyth) in order to prevent charging.

Among them, FIGS. 16(*a*) through 16(*d*) show the SEM observation image of the surface of the sample A obtained by adjusting the CNT 27 and dispersing agent (NMP) to 1:1 to prepare a dispersing solvent of the CNT 27, then, dipping the sample piece 29 in the dispersing solvent for 10 seconds and pulling it up, and then, cutting the central part of the sample piece 29 into a rectangular shape. In FIG. 16(*a*) shows an SEM observation image magnified 35,000 times; FIG. 16(*b*), magnified 15,000 times; FIG. 16(*c*), magnified 7,000 times; and FIG. 16(*d*), magnified 3,000 times, respectively.

The scale bars of each observation image are all 1 μm, respectively. Among the respective observation images, the white color part shows the CNT 27. It was visually observed that the CNT 27 is uniformly dispersed on the primary film 23.

FIGS. 17(*a*) through 17(*d*) show the SEM observation image of the surface of the sample B obtained by adjusting the CNT 27 and dispersing agent (NMP) to 1:2 to prepare a dispersing solvent of the CNT 27, then, dipping the sample piece 29 in the dispersing solvent for 10 seconds and pulling it up, and then, cutting the central part of the sample piece 29 into a rectangular shape. FIG. 17(*a*) shows an SEM observation image magnified 35,000 times; FIG. 17(*b*), magnified 15,000 times; FIG. 17(*c*), magnified 7,000 times; and FIG. 17(*d*), magnified 7,000 times, respectively.

The scale bars of each observation image are all 1 μm, respectively. Among the respective observation images, the white color part shows the CNT 27. This CNT 27 is uniformly dispersed on the primary film 23. In FIG. 17, the CNT 27 is more favorably dispersed on the CNT 27 and integrated with high density, when compared with the case of FIG. 16, by the amount of the dispersing agent (NMP) increased.

FIGS. 18(*a*) through 18(*d*) show the SEM observation image of the surface of the sample C obtained by adjusting the CNT 27 and dispersing agent (NMP) to 1:2 to prepare a dispersing solvent of the CNT 27, then, dipping the sample piece 29 in the dispersing solvent for 10 seconds and pulling it up, and then, cutting the central part of the sample piece 29 into a rectangular shape. FIG. 18(*a*) shows an SEM observation image magnified 35,000 times; FIG. 18(*b*), magnified 15,000 times; FIG. 18(*c*), magnified 7,000 times; and FIG. 18(*d*), magnified 3,000 times, respectively.

The scale bars of each observation image are all 1 μm, respectively. Among the respective observation images, the white color part shows the CNT 27. This CNT 27 is uniformly dispersed on the primary film 23. In FIG. 18, it is presumable that the CNT 27 is more favorably dispersed on the dispersing agent and integrated with high density, when compared with the cases of FIGS. 16(*a*) through 16(*d*) and 17(*a*) through 17(*d*), by the amount of the dispersing agent (NMP) increased. From those results, it was confirmed that the CNT 27 is favorably dispersed on the dispersing agent and integrated with more high density.

FIGS. 19(*a*) through 19(*d*) show the SEM observation image of the surface of the sample A obtained by adjusting the CNT 27 and dispersing agent (NMP) to 1:1 to prepare a dispersing solvent of the CNT 27, then, dipping the sample piece 29 in the dispersing solvent for 10 seconds and pulling it up, and then, cutting the central part of the sample piece 29 into a rectangular shape. FIG. 19(*a*) shows the SEM observation image magnified 35,000 times; and FIG. 19(*b*), magnified 3,000 times, respectively.

Also, the SEM observation image of the sample D is obtained by cutting a distal end part of the sample piece 29 into a rectangular shape. In FIG. 19, (a) shows the SEM observation image magnified 35,000 times, and (b); magnified 3,000 times, respectively.

The scale bars of each observation image are all 1 μm, respectively. Among the respective observation images, the white color part shows the CNT 27. This CNT 27 is uniformly dispersed on the primary film 23.

The SEM observation image of the central part is almost same as that of FIGS. 16(*a*) through 16(*d*). Likewise, the SEM observation images at the cutting positions of the central part and distal end part were almost same, respectively. No difference was observed depending on the cutting position.

The actual CNT 27 dispersing operation was performed in the following manner. After a predetermined amount of the CNT 27 was mixed with the dispersing agent (NMP), the mixture was exerted an ultrasonic vibration of approximately 40 to 60 kHz for about an hour by, for example, a ultravibrator (not shown) to promote the dispersion of the CNT 27.

Then, the dispersing solvent containing the CNT 27 is received in a paint tank 20, as shown in FIG. 4, of a paint spraying gun in a painting booth (not shown). The painting booth is designed such that charging and discharging operation of the gas inside the painting booth can be performed with accuracy, leakage of the spraying gas containing the CNT 27 can be prevented, and workers, when working, can be prevented from intaking the spraying gas so that health damage can be prohibited.

Under the foregoing circumstance, the work 3 with the primary film 23 deposited thereon is delivered to the painting booth and then suspended via a jig 25. Then, the dispersing solvent containing the CNT 27 is sprayed to the primary film 23.

In doing so, the dispersing solvent containing the CNT 27 is adhered onto the primary film 23 such that it finely bites into the irregular part of the primary film 23 and firmly adheres thereto. Thereafter, a hot air is applied to the dispersing solvent containing the CNT 27 or the dispersing agent is naturally dried, so that the carbon film 30 is formed via the dispersing solvent.

As learned from the foregoing, the carbon film 30 can be formed by the spraying operation using the spraying gun 19 easily and inexpensively. The surface of the carbon film 30 is caused to exhibit light black color by the CNT 27 and formed into an irregular pattern along the irregular part of the primary film 23. Consequently, the work 3 has an outstanding electrical conductivity and thermal conductivity, heat resistance, high strength and flexibility owing to the characteristics of carbon.

On the other hand, it is also an interesting alternative that after the dispersing solvent containing the CNT 27 is dried, the dispersing solvent containing the CNT 27 is sprayed onto the surface of the carbon film 30, and the resultant is dried to form a carbon film 30a newly. Then, the dispersing solvent containing the CNT 27 is sprayed onto the surface of the carbon film 30, and the resultant is dried to form a carbon film 30b newly.

Figure 20:
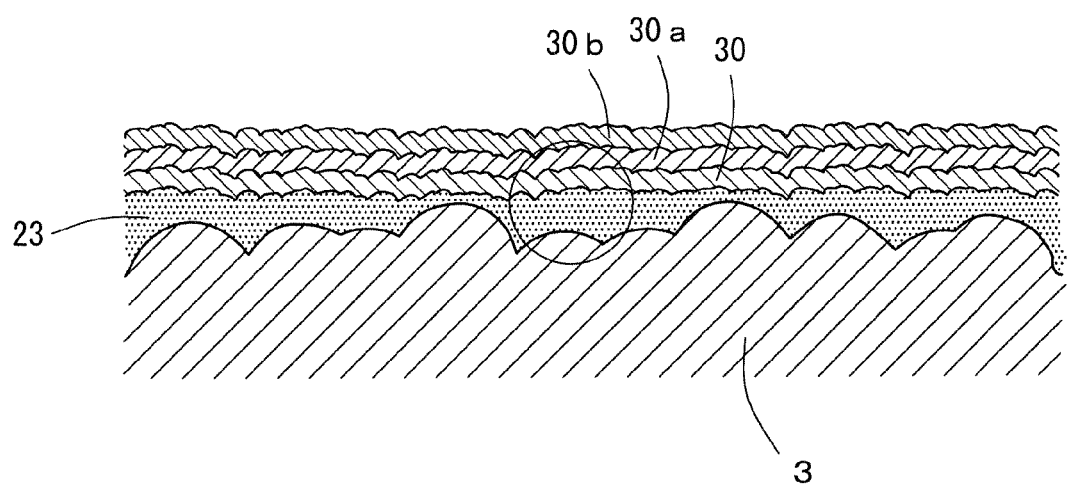
FIG. 20 is a sectional view showing, in an enlarged scale, a state, in which a plurality of layers of the carbon film are disposed at the surface of the primary film according to the second embodiment.

In that case, the surface of the carbon film 30a, 30b are formed in an irregular pattern as described hereinbefore, the dispersing solvent containing the CTN 27 finely bites into the irregular part of the primary film 23 and firmly adheres thereto, so that a plurality of carbon films 30, 30a, 30b are formed into layers to peeling thereof. This state is as shown in FIG. 20, wherein the work 3 has an outstanding electrical conductivity and thermal conductivity, heat resistance, high strength and flexibility owing to the characteristics of the carbon obtained by the plurality of carbon films 30, 30a, 30b.

Figure 21:
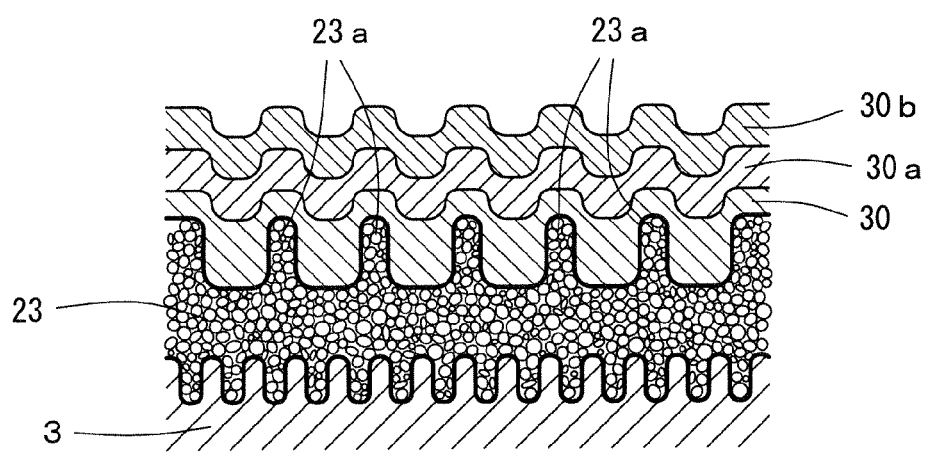
FIG. 21 is a sectional view showing, in an enlarged scale, the important part of FIG. 20, in which the irregularities of the surface of the primary film function like a chopstick stand and the carbon film bites into the irregularities.

Also, by virtue of the porous structure of the primary film 23, the plural irregularities or holes of the surface function like a chopstick holder, and the carbon film 30, which is the secondary film, is converged and embedded among the irregular part 23a or holes as shown in FIG. 21. Accordingly, the embedding density of the carbon film 30, 30a, 30b becomes controllable by the holes. Thus, the carbon film 30, 30a, 30b is distributed to the irregular part or hole part with high density and firmly adhered thereto.

Since the carbon film 30 eventually forms an impregnation layer on the surface layer part of the primary film 23 and is integrated with the primary film 23, the carbon layer 30, 30a, 30b is prevented from peeling, and the carbon film 30, 30a, 30b having a multilayer structure is firmly and rigidly adhered thereto. Moreover, since the plural carbon films 30, 30a, 30b byte into the protecting parts 23a or thereamong, and integrated, they are firmly and intimately adhered thereto to prevent from peeling.

In this way, according to the second embodiment, since the surface of the work 3 is impregnated with the primary film 23 and the primary film 23 is impregnated with the carbon film 30 to promote integration thereof so that those components are intimately adhered to one another, peeling and cracking thereof can be prevented even when the primary film 23 and carbon film 30, 30a, 30b are bent.

Moreover, since the surface of the work 3 is coated with the primary film 23 and the primary film 23 is finely and rigidly coated with the carbon film 30, 30a, 30b, it exhibits an outstanding electrical conductivity and thermal conductivity, heat resistance, high strength and flexibility owing to the characteristics of the carbon.

Furthermore, since the primary film 23 is porous and flexible, the fine particles of the carbon film 30 easily enter and byte therein, and disengagement therefrom is prevented. The carbon film 30, 30a, 30b is reliably embedded and functions like an anchor component.

Accordingly, the carbon film 30, 30a, 30b is firmly and rigidly formed, and other components such as the carbon film 30, 30a, 30b, as well as a coating and functional materials, which are adopted in accordance with necessity, are promoted to connect thereto.

Figure 22:
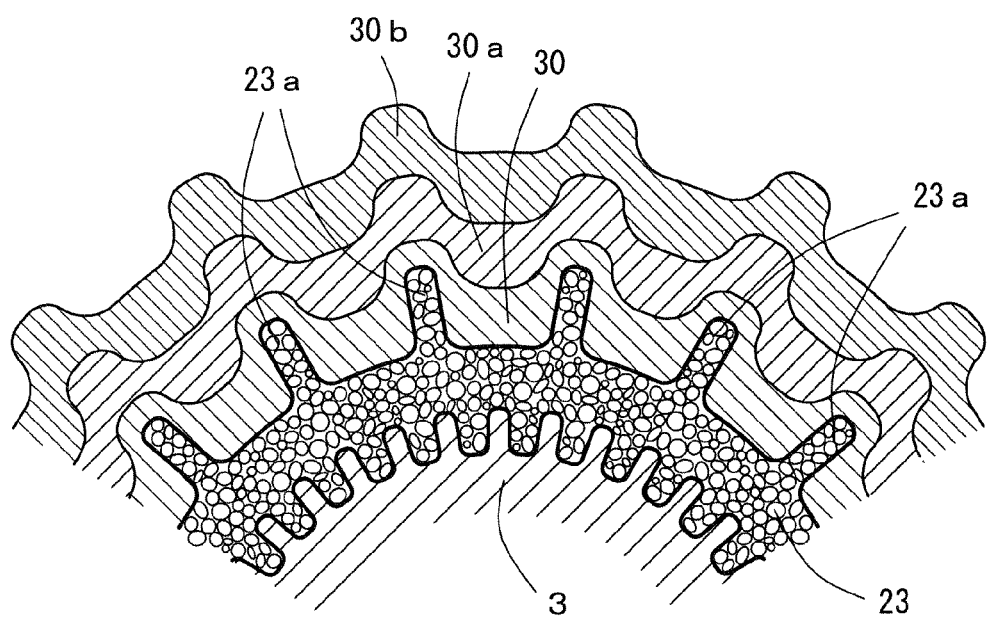
FIG. 22 is a sectional view showing, in an enlarged scale, a bending state of the work of FIG. 21.
Figure 25:
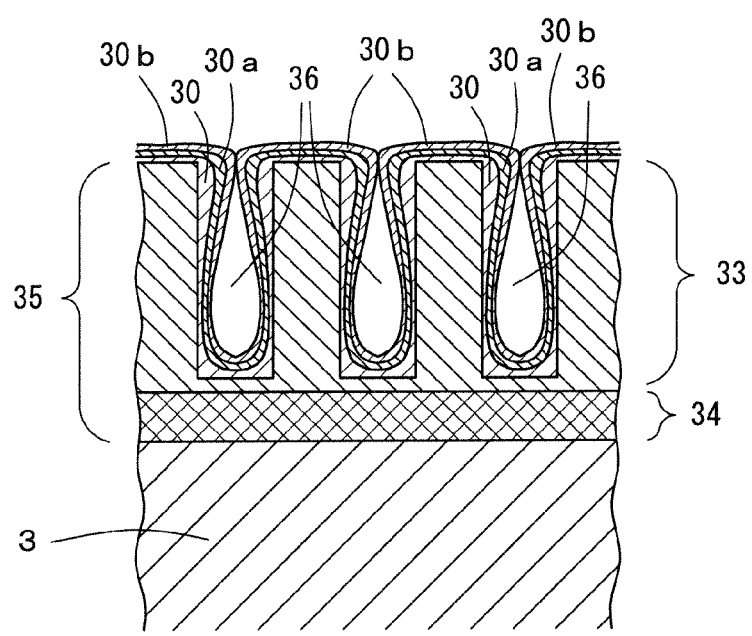
FIG. 25 is a sectional view showing, in an enlarged scale, an important part of the fourth embodiment of the present invention, in which a carbon film is disposed at a surface and a hole of the anodic oxide film such that the surface and the hole are coated, the inner surface of the hole part is coated and the hole part is sealed by the anodic oxide film.

In addition, as described previously, since the carbon film 30, 30a, 30b is disposed to the irregular part among the crystals of the primary film 23 independently and with high density, even if a stress is applied to a part of the carbon film 30, 30a, 30b or crystals, the rest of the carbon film 30, 30a, 30b or crystals are not affected. As shown in FIG. 22, even if the work 3 is bent after the plural carbon films 30, 30a, 30b are formed, the stress is dispersed. Likewise, even if the carbon films 30, 30a, 30b are damaged, peeling and/or cracking are not occurred.

Thus, the work 3 with the carbon film 30, 30a, 30b already formed thereon has a good workability, and is preferably subjected to various processing techniques. The surface of the carbon film 30, 30a, 30b was cut in a lattice pattern, and peeling of a cross-cut piece was tested. No peeling was observed, and the high density and integrity of the carbon film 30, 30a, 30b were observed.

Taking advantage of such outstanding characteristics as mentioned above, therefore, painting of an aircraft, surface treatment and weight reduction of the aircraft can be achieved. Moreover, there can be obtained such effects as high functionality, high quality and defogging of the galley and lavatory in an aircraft. In addition, strength of a heat exchanger for an aircraft, heat conductivity, heat dissipation and durability can be improved.

Furthermore, in the field of automobiles and industrial equipment, there can be obtained a paint which is improved in heat resistance of a brake caliper, prohibition of chipping caused by a cutter of an exhaust muffler, and improvement in heat dispersion of a rotary blade of a vacuum pump. In the medical field, this technology can be applied to a high-performance knife for medical use and a high-performance part. In the field of shipping industry, improvement of fuel efficiency can be achieved by the reduction of attached substances caused by painting of the hull.

Then, the inventor came up with a method for dipping, instead of spraying or applying the dispersing solvent containing the CNT 27, in order to achieve the coating of the carbon film 30, as the third embodiment.

According to this method, as shown in FIGS. 23(*a*) through 23(*c*), the dispersing solvent 32, which is prepared by mixing predetermined amounts of the CNT 27 and dispersing agent (NMP) at a predetermined ratio, is received in the bath 31, dipping the work 3 with the primary film 23 formed on the surface thereof in the dispersing solvent 32, while moving the work 3 up and down via the jig 25 in the manner as described above, so that the dispersing solvent 32 is adhered or absorbed to the surface of the primary film 23. After a lapse of a predetermined time, the work 3 is pulled up from the bath 31 and a hot air having a temperature of approximately 80 to 95° C. is applied to the surface of the work 3 for drying. Thereafter, the dipping and drying are repeatedly performed to coat plural layers of the carbon film 30, 30a, 30b containing the CNT 27 on the surface of the primary film 23.

According to the third embodiment as described above, since the carbon film 30 is coated on the surface of the porous primary film 23, the carbon film 30 can be formed rigidly and densely compared with the conventional art in which a carbon film is coated on a smooth surface of a work. Thus, it is possible to equally obtain an outstanding electrical conductivity and thermal conductivity, heat resistance, high strength and flexibility owing to the characteristics of carbon, Moreover, the present inventor paid his attention to a myriad (hundreds of millions to tens of millions) of fine pores 36 (100 to 300 Å in diameter) formed on an oxide film 35 comprising an extremely hard porous bulk layer 33 containing moisture, and a dense and active amorphous alumina barrier layer 34, which arrangement is, as the fourth embodiment (see FIGS. 24(*a*) through 24(*c*) and 25), based on the known anodic oxidation method, in which the work 3 made from aluminum and its alloy is connected to the anode, the cathode material such as a lead plate is connected to the cathode, and those components are dipped in the electrolytic solution such as sulfuric acid, oxalic acid or the like and a voltage is applied thereto so that a porous is formed on the surface of the work 3.

Then, after the conventional coloring method or pore sealing treatment using the pores 36, instead of the coloring method or pore sealing treatment, the work 3 with the anodic oxide film 35 formed thereon is dipped in the dispersing solvent 32 received in the bath 31, the dispersing solvent 32 is adhered or absorbed to the inside and surfaces of the fine pores 36 and after a lapse of a predetermined time, the work 3 is pulled up from the bath 31 and dried. In this case, since the carbon film 30 is black, the work 3 can be colored to black by inserting the carbon film 30 into the pores 36 and adhering it to the surface of each pore 36.

Accordingly, it has such an advantage that the pore sealing treatment and the coloring treatment can be realized conveniently and with the use of a simple inexpensive facility, and without a need of a large scaled expensive facility as required conventionally.

Thereafter, the dipping and drying are repeatedly performed to coat plural layers of the carbon film 30 containing the CNT 27 to the inside and surfaces of the fine pores 36. Thus, it is possible to provide them with the outstanding electrical conductivity and thermal conductivity, heat resistance, high strength and flexibility owing to the characteristics of carbon, The oxide film 35 thus obtained exhibits black color. Further, instead of the conventional coloring or together with the conventional coloring, it can exhibit an appearance with a novel color. Moreover, owing to the carbon film 30 formed on the inside and surface of each pore 36, it is also possible to obtain the same effect as the conventional pore sealing effect, and to obtain corrosion resistance.

Moreover, since the inside and surface of each pore 36 are caused to exhibit, by the carbon film 30 containing the coated CNT 27, the outstanding electrical conductivity and thermal conductivity, heat resistance, high strength and flexibility owing to the characteristics of carbon, this version of the present invention has more excellent mechanical and electrical characteristics than the conventional anodic oxidation method, it can be expected that this version of the present invention can be utilized in various technical fields.

The electric plating terms and related treatment terms used in the basic form and in the respective embodiments are based on JIS H0400. The testing method for the thickness of plating is based on JIS H8501, the testing method for adhesion of plating, based on JISH8504, the testing method for the thickness of anodic oxide film of aluminum and its alloy—First Part:: microscopic cross section measurement method, based on JIS H8680-1, paint terms, based on JIS K5500, paint general test method—Fifth Part; mechanical properties of coating film—Chapter 1: flexibility resistance (cylindrical mandrel method), based on JIS K5600-5-1, paint general test method—Fifth Part: mechanical properties of coating film—Chapter 6: adhesion (cross cut method), based on JIS K5600-5-5, cellophane adhesive tape, based on JIS Z1522, classification by light source color and color rendering property of fluorescent lamp, based on JIS Z9112, respectively.

It should be noted here that the raw material (work) refers to iron, steel or non-ferrous metal before they are subjected to coating treatment. The oxide ceramics film and the composite film refer to such films that after the raw material (work) is plated, a coating treatment is applied thereto by high functional material of thin film, so that coating performance is added to plating performance in order to greatly improve such quality as adhesion, durability, decorativeness and the like.

In this case, it is possible to reduce the thickness of a colored composite film from 15 μm to 20 μm by controlling the polymer chains and applying high density secondary coating onto the plating of the primary film having an average film thickness of 0.1 μm to 10 μm.

The present invention is suitable for a carbon film coating structure for a work, in which a carbon material such as a carbon nanotube is applied to the work for coating thereof with high density and high integration so that it has an outstanding electrical conductivity and thermal conductivity, heat resistance, high strength and flexibility owing to the characteristics of carbon, and in which a carbon such as CNT is applied to the work for coating thereof easily and inexpensively, and with high density and high integration.

The invention claimed is:

1. A work having a film coating structure thereon, comprising:
 a work comprising stainless steel nickel iron, copper, aluminum, brass, or alloys, and having a surface layer;
 a film coating structure comprising:
 a porous primary film comprised of a suboxide or oxide and formed on the surface layer of the work, the primary film having fine pores with an average pore diameter of from 100 to 300 Å, being softer and lower in conductivity than a metal chromium, and being insulative and corrosion resistant;
 a carbon film provided on the porous primary film and comprised of a functional material carbon nanotubes, fullerene and/or graphene and the carbon nanotubes being directly engaged by the fine pores of the primary film at a surface layer of the primary film, wherein the functional material is selected from the group consisting of difluoride material, tetra fluoride material, fluorine compound, titanium dioxide, zinc oxide, manganese dioxide, alumina, bentonite, hydroxyapatite, zeolite, talc, collinite, porous silica, gold, platinum, palladium, boron nitride, titanium nitride, aluminum nitride, diamond-like carbon, magnetic material, metallic material, and carbon material;

a thin secondary film provided on the carbon film and comprised of a paint of a polymer and 5% by weight of carbon nanotubes incorporated therein, wherein the carbon nanotubes have a diameter of 10 to 15 nm and a length of about 10 microns, and wherein the primary film has a thickness of about 1 to 1.5 μm, the carbon film having a thickness of about 1 and the secondary film having a thickness of about 5 μm.

2. The work having a film coating structure thereon as claimed in claim 1, wherein the work, the primary film and the secondary film are integrated.

3. The work having a film coating structure thereon as claimed in claim 1, wherein the carbon nanotubes are multilayer carbon nanotubes.

4. The work having a film coating structure thereon as claimed in claim 1, wherein the carbon nanotubes are carbon nanotubes having good compatibility with the primary film.

5. The work having a film coating structure thereon as claimed in claim 4, wherein the carbon nanotubes having good compatibility with the primary film are single layer carbon nanotubes, dual layer carbon nanotubes or multilayer nanotubes of more than two layers.

6. The work having a film coating structure thereon as claimed in claim 5, wherein the carbon nanotubes are of purity 95% or greater.

7. The work having a film coating structure thereon as claimed in claim 6, wherein the carbon film carbon nanotubes are applied to the primary film as a dispersion of the carbon nanotubes in a solvent having a low vaporization point and easily dried and which comprises a material selected from the group consisting of dichlorobenzene, isopropyl alcohol, acetone, and ethyl alcohol.

8. The work having a film coating structure thereon as claimed in claim 1, wherein the carbon film carbon nanotubes are applied as a dispersion in a volatile dispersant in a dilution ratio predetermined to integrate a greatest density of carbon nanotubes with the primary film.

9. The work having a film coating structure thereon as claimed in claim 1, wherein the carbon film is comprised of one or more layers.

10. The work having a film coating structure thereon as claimed in claim 1, wherein the work is comprised of aluminum, the primary film is an anodic oxide of aluminum, the surface layer of the work on which the primary film is formed includes interior surfaces of a hole part in the work and the secondary film seals the primary film formed on the interior surfaces of the hole part.

11. The work having a film coating thereon as claimed in claim 10, wherein the interior surfaces of the hole part are completely covered by the secondary film or the secondary film seals the hole part and completely covers the interior surfaces of the hole part.

* * * * *